United States Patent
Rodler et al.

(10) Patent No.: US 11,914,721 B2
(45) Date of Patent: Feb. 27, 2024

(54) METHOD AND CONTRACT REWRITING FRAMEWORK SYSTEM FOR SUPPORTING SMART CONTRACTS IN A BLOCKCHAIN NETWORK

(71) Applicant: NEC Laboratories Europe GmbH, Heidelberg (DE)

(72) Inventors: Michael Rodler, Duisburg (DE); Lucas Davi, Duisburg (DE); Ghassan Karame, Heidelberg (DE); Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 262 days.

(21) Appl. No.: 17/608,759

(22) PCT Filed: Jun. 9, 2020

(86) PCT No.: PCT/EP2020/065993
§ 371 (c)(1),
(2) Date: Nov. 4, 2021

(87) PCT Pub. No.: WO2020/249572
PCT Pub. Date: Dec. 17, 2020

(65) Prior Publication Data
US 2022/0318399 A1    Oct. 6, 2022

Related U.S. Application Data

(60) Provisional application No. 62/860,306, filed on Jun. 12, 2019.

(51) Int. Cl.
*G06F 7/04* (2006.01)
*G06F 21/57* (2013.01)
(Continued)

(52) U.S. Cl.
CPC ............ *G06F 21/577* (2013.01); *G06F 8/656* (2018.02); *G06F 21/64* (2013.01); *G06Q 20/389* (2013.01); *G06F 2221/033* (2013.01)

(58) Field of Classification Search
CPC .. G06F 21/577; G06F 21/64; G06F 2221/033; G06F 21/12; G06F 21/125; H04L 9/50
See application file for complete search history.

(56) References Cited

U.S. PATENT DOCUMENTS 11,170,097 B1 * 11/2021 Kim .................. G06F 21/54
2019/0278767 A1 * 9/2019 Cao .................. G06F 16/2365
(Continued)

FOREIGN PATENT DOCUMENTS

WO    WO 2018144153 A1    8/2018
WO    WO 2018172439 A1    9/2018

OTHER PUBLICATIONS

Tikhomirov et al., SmartCheck: Static Analysis of Ethereum Smart Contracts of Ethereum Smart Contracts, IEEE, May 27, 2018, pp. 9-16. (Year: 2018).*

(Continued)

*Primary Examiner* — Philip J Chea
*Assistant Examiner* — Jenise E Jackson
(74) *Attorney, Agent, or Firm* — Leydig, Voit & Mayer, Ltd.

(57) ABSTRACT

A blockchain smart contract rewriting framework system has a vulnerability detection tool, a rewriter tool, and a deployment component. The deployment component obtains a permission to upgrade the smart contract, which granted by a smart contract creator/owner. The contract rewriting framework system retrieves the smart contract from the blockchain network, and passes it to the vulnerability detection tool. The vulnerability detection tool detects a vulnerability in the smart contract, and determines (Continued)

a type of the vulnerability and an instruction location of the vulnerability. The rewriter tool rewrites the smart contract to include a patch for fixing the vulnerability, a patched smart contract being generated by the rewriter tool based on the type of the vulnerability and the instruction location of the vulnerability. The deployment component issues an upgrade transaction including the patched smart contract to the blockchain network, such that the patched smart contract is deployed in the blockchain network.

15 Claims, 15 Drawing Sheets

(51) Int. Cl.
  G06F 8/656 (2018.01)
  G06F 21/64 (2013.01)
  G06Q 20/38 (2012.01)

(56) References Cited

U.S. PATENT DOCUMENTS

2019/0288853 A1* 9/2019 Gray .................. H04L 9/3247
2020/0014720 A1* 1/2020 Giura ..................... G06F 8/65

OTHER PUBLICATIONS

Wang et al., Vultron: Catching Vulnerable Smart Contracts Once and for All, IEEE, May 31, 2019, pp. 1-4. (Year: 2019).*

Kalra, et al., "Zeus: Analyzing Safety of Smart Contracts," *25th Annual Network and Distributed System Security Symposium*, Dec. 2018, pp. 1-15, Internet Society, Reston, VA, USA.

Luu, et al., "Making Smart Contracts Smarter," *Proceedings of the 2016 ACM SIGSAC Conference on Computer and Communications Security*, Dec. 2016, pp. 1-16, Association for Computing Machinery, New York, USA.

Tsankov, et al., "Securify Practical Security Analysis of Smart Contracts," *Proceedings of the 2018 ACM SIGSAC Conference on Computer and Communications Security*, Jan. 15, 2018, pp. 67-82, Association for Computing Machinery, New York, USA.

Torres, et al., "OSIRIS: Hunting for Integer Bugs in Ethereum Smart Contracts," *ACSAC*, Dec. 2018, pp. 1-13, Applied Computer Security Associates, Olney, MD, USA.

Jentzsch, "The History of the DAO and Lessons Learned," *slock.it*, Aug. 24, 2016, pp. 1-9, Blockchains, Sparks, NV, USA.

Krupp, et al., "Teether: Gnawing at Ethereum to Automatically Exploit Smart Contracts," *27th USENIX Security Symposium*, Aug. 2018, pp. 1-18, USENIX Association, Berkeley, CA, USA.

Nikolic, et al., "Finding the Greedy, Prodigal, and Suicidal Contracts at Scale," *Proceedings of the 34th Annual Computer Security Applications Conference*, Mar. 14, 2018, pp. 1-15, Applied Computer Security Associates, Olney, MD, USA.

Github, "Manticore", *GitHub*, Jun. 10, 2021, pp. 1-12, GitHub Inc., San Francisco, CA, USA.

Consensys, "Ethereum Smart Contract Best Practices: Upgrading Broken Contracts," *ConsenSys*, Dec. 2016, pp. 1-9, ConsenSys, New York, NY, USA.

Openzeppelin, "OpenZeppelin," *OpenZeppelin*, Dec. 2020, pp. 1-14, OpenZeppelin, Walnut, CA, USA.

* cited by examiner

```
1  function batchTransfer(address[] _receivers,
2                         uint256 _value)
3                         public whenNotPaused
4                         returns (bool)
5  {
6      uint cnt = _receivers.length;
7      // OVERFLOW: 2 * ((INT_MAX / 2) + 1) == 0
8      uint256 amount = uint256(cnt) * _value;
9      require(cnt > 0 && cnt <= 20);
10     // BYPASSED CHECK: balances[msg.sender] >= 0
11     require(_value > 0 && balances[msg.sender] >= amount);
12     //...
13     // RESULT: Transfer of ((INT_MAX / 2) + 1) tokens
14     //...
```

Fig. 5

```
1  // ...
2  PUSH2 0xd9f
3  SWAP1
4  SWAP2
5  SWAP1
6  PUSH4 0xffffffff
7  AND
8  JUMP
9  // ...
```

Fig. 8

```
// original code
0x00: PUSH1 0x1    // (gas: 3)
0x02: PUSH1 0x1    // (gas: 3)
0x04: ADD          // (gas: 3)
0x05: JUMPDEST     // (gas: 1)
0x06: STOP         // (gas: 0)
```

```
// patched code
// TRAMPOLINE
0x00: PUSH1 0x7    // (gas: 3)
0x02: JUMP         // (gas: 8)
0x03: INVALID      // (gas: 0)
0x04: INVALID      // (gas: 0)
// continuation of original code
0x05: JUMPDEST     // (gas: 1)
0x06: STOP         // (gas: 0)

// PATCHED BASIC BLOCK (called via trampoline)
0x07: JUMPDEST     // (gas: 1)
0x08: PUSH1 0x1    // (gas: 3)
0x0a: PUSH1 0x1    // (gas: 3)
// CHECKED ADD
0x0c: DUP1         // (gas: 3)
0x0d: SWAP2        // (gas: 3)
0x0e: ADD          // (gas: 3)
0x0f: DUP1         // (gas: 3)
0x10: SWAP2        // (gas: 3)
0x11: SWAP1        // (gas: 3)
0x12: LT           // (gas: 3)
0x13: ISZERO       // (gas: 3)
0x14: PUSH1 0x1b   // (gas: 3)
0x16: JUMPI        // (gas: 10)
0x17: PUSH1 0x0    // (gas: 3)
0x19: DUP1         // (gas: 3)
0x1a: REVERT       // (gas: 0)
0x1b: JUMPDEST     // (gas: 1)
// jump-back to original code:
0x1c: PUSH1 0x5    // (gas: 3)
0x1e: JUMP         // (gas: 8)
```

Fig. 10

| Contract | CVE Number | #Evaluated Tx | #Attack Tx |
|---|---|---|---|
| BEC [2] | CVE-2018-10299 | 424,229 | 1 |
| SMT [14] | CVE-2018-10376 | 56,555 | 1 |
| UET [21] | CVE-2018-10468 | 24,034 | 55 |
| SCA [15] | CVE-2018-10706 | 292 | 1 |
| HXG [6] | CVE-2018-11239 | 1,497 | 9 |

Fig. 11

| Contract | #Patch | Gas Overhead | | Code Size Increase (B) | |
|---|---|---|---|---|---|
| | | Rewriter | SafeMath | Rewriter | SafeMath |
| BEC | 1 | 83 | 164 | 117 (1.0%) | 133 (1.1%) |
| SMT | 1 | 47 | 108 | 191 (0.8%) | 97 (0.4%) |
| UET | 12 | 225 | 21 | 1,299 (18.2%) | 541 (7.6%) |
| SCA | 10 | 47 | 0 | 3,811 (17.3%) | 361 (1.6%) |
| HXG | 5 | 120 | 541 | 997 (28.1%) | 519 (14.6%) |

Fig. 12

| #Patch | Orig Size (B) | Patched Size Increase (B) |
|---|---|---|
| 3.9 | 8,142.7 | 455.9 (5.6%) |

Fig. 13

```
1  uint8 public constant burnPerTransaction = 2;
2  mapping (address => uint256) public balanceOf;
3  // ...
4  function _transfer(address _from, address _to, uint _value) internal {
5  // ...
6  // Line 85 in the Hexagon contract
7  balanceOf[_from] -= _value + burnPerTransaction;
8  // ...
```

```
1  // ...
2  SHA3       // this computes the address of balanceOf[_from] mapping
3  DUP1
4  SLOAD      // load balanceOf[_from]
5  PUSH1 0x1
6  NOT        // ~1 == 0xfffffffffffffffffffffffffffffffffffffffffffffffffffffffffffffffe == -2
7  SWAP1      // balanceOf[_from] on top
8  DUP8       // the passed parameter '_value'
9  SWAP1      // stack = [ _balanceOf[_from], _value, -2, ... ]
10 SUB        // x = _balanceOf[_from] - _value
11 DUP2       // stack = [-2, _balanceOf[_from] - _value, -2, ...]
12 ADD        // -2 + (_balanceOf[_from] - _value)
13 // ...
```

Fig. 15

METHOD AND CONTRACT REWRITING FRAMEWORK SYSTEM FOR SUPPORTING SMART CONTRACTS IN A BLOCKCHAIN NETWORK

CROSS REFERENCE TO RELATED APPLICATIONS

This application is a U.S. National Phase application under 35 U.S.C. § 371 of International Application No. PCT/EP2020/065993, filed on Jun. 9, 2020, and claims benefit to U.S. Patent Application No. 62/860,306, filed on Jun. 12, 2019. The International Application was published in English on Dec. 17, 2020, as WO 2020/249572 A1 under PCT Article 21(2).

FIELD

The present invention relates to a method and a contract rewriting framework system for supporting smart contracts in a blockchain network.

BACKGROUND

The adoption of Bitcoin has fueled innovation, and there are currently more than five hundred alternative blockchains. In particular, with the extended definition of smart contracts as distributed applications, users can build different types of payment systems and cryptocurrencies along with their applications in blockchains.

With respect to the current state of the art in the context of smart contracts in blockchain, for example, it is referred to the following non-patent literature according to labels [1] to [9]:

- [1] C. Jentzsch, "The History of the DAO and Lessons Learned," Oct. 10, 2017. [Online]. Available: https://blog.slock.it/the-history-of-the-dao-and-lessons-learned-d06740f8cfa5.
- [2] L. D.-H. C. H. O. P. S. a. A. H. Luu, "Making smart contracts smarter.," in Proceedings of the 2016 ACM SIGSAC conference on computer and communications security, 2016.
- [3] P. A. D. D. D.-C. A. G. F. B. a. M. V. Tsankov, "Securify: Practical security analysis of smart contracts," in Proceedings of the 2018 ACM SIGSAC Conference on Computer and Communications Security, 2018.
- [4] S. S. G. M. D. a. S. S. Kalra, "Zeus: Analyzing safety of smart contracts," in 25th Annual Network and Distributed System Security Symposium, 2018.
- [5] J. a. C. R. Krupp, "teether: Gnawing at ethereum to automatically exploit smart contracts," in 27th USENIX Security Symposium, 2018.
- [6] I. A. K. I. S. P. S. a. A. H. Nikolie, "Finding the greedy, prodigal, and suicidal contracts at scale," in Proceedings of the 34th Annual Computer Security Applications Conference, 2018.
- [7] "Manticore," [Online]. Available: https://github.com/trailofbits/manticore.
- [8] "Ethereum Smart Contract Best Practices: Upgrading Broken Contracts," [Online]. Available: https://consensys.github.io/smart-contract-best-practices/software engineering/#upgrading-broken-contracts.
- [9] "ZeppelinOS," [Online]. Available: https://zeppelinos.org/.

Given such wide adoption with regard to blockchains, applications in popular blockchain platforms such as Ethereum often become targets of attackers, who exploit the vulnerabilities of the contracts and steal cryptocurrencies. One especially infamous incident is the DAO attack, which resulted in a loss of over 50 million US Dollars worth of Ether at the time the attack occurred in 2016 (cf. reference [1]). Since then, many static and dynamic analysis tools such as described in references [2], [3] and [4] have been proposed, in order to detect smart contract vulnerabilities in development stage as well as in run-time. Automatic detection of such access control vulnerabilities has also previously studied in the context of automated exploit generation (cf. e.g. references [5] and [6]).

Smart contracts are used in modern blockchain systems to allow nearly arbitrary (Turing-complete) business logic to be implemented. They enable autonomous management of cryptocurrency or tokens and have the potential to revolutionize many business applications by removing the need for a trusted (maybe malicious) third party, e.g., in applications for payments, insurances, crowd funding, or supply chains. Due to their ease of use and the high amount of cryptocurrency value some of these contracts hold, smart contracts have become an appealing target for attacks. Programming errors in smart contract code can have devastating consequences as an attacker can exploit these bugs to steal cryptocurrency or tokens.

Recently, the blockchain community has witnessed several incidents due smart contracts errors. As already mentioned above, one especially infamous incident is the "TheDAO" attack, which resulted in a loss of over 50 million US Dollars worth of Ether. This led to a highly debated hard-fork of the Ethereum blockchain. "TheDAO" attack was possible due to a re-entrancy vulnerability. Several proposals demonstrated how to defend against re-entrancy vulnerabilities either by means of offline analysis at development time or by performing run-time validation. Another infamous incident is the parity wallet attack. In this case, an attacker moved a smart contract into a state, where the currency held by the contract could not be accessed anymore. This resulted in a total of about 500 k Ether to be stuck in smart contracts due to an access control error. Automatic detection of such access control vulnerabilities has been previously studied in the context of automated exploit generation. Further, integer overflow bugs constitute a major vulnerability class in smart contracts. Such bugs occur when the result of an arithmetic operation has a longer width than the integer type can hold. According to the study by Tones et al. (cf. C. Ferreira Torres, J. Schutte, and Others, "Osiris: Hunting for integer bugs in ethereum smart contracts," in 34th Annual Computer Security Applications Conference (ACSAC18), San Juan, Puerto Rico, USA, Dec. 3-7, 2018, 2018. [Online]. Available: http://orbilu.uni.lu/handle/10993/36757) more than 42 k contracts suffer from an integer bug. They especially affect so-called ERC-20 Token contracts, which are leveraged in Ethereum to create subcurrencies. Interestingly, most of the disclosed vulnerabilities were actually exploited leading to substantial token and ether losses.

These attacks have fueled interest in the community to enhance the security of smart contracts. In this respect, a number of solutions ranging from devising better development environments to using safer programming languages, formal verification, symbolic execution, and dynamic run-time analysis have been proposed in the last few years. It is pointed out nevertheless that all these solutions only aim to prove the correctness or absence of a certain type of vulnerability and as such cannot be used to protect already deployed (legacy) contracts. Even worse, once a particular contract has been flagged as vulnerable, it is unclear how to upgrade it. Naive approaches require the contract owner to deprecate the vulnerable contract, move all funds out of the contract, deploy a new contract, and move the funds to the new contract. This process is further exacerbated when the address of the vulnerable contract is referenced by other contracts. Moreover, developers also need to ensure that the patched version of the contract is compatible with the previously deployed version. Even small changes like changing the ordering of variables in the source code can already break this compatibility. As a result, patching smart contract errors is currently a time-consuming, cumbersome, and error-prone process. For example, while patching the Parity multisig wallet contract, the developers accidentally introduced another bug, which resulted in Ether being lost; simply because a function was incorrectly named.

On top of that, patching smart contract bugs is highly time-critical. In contrast to errors discovered in PC or mobile software, smart contract errors are unique from an attacker's point of view as (1) smart contracts are always online on the blockchain, (2) they usually hold a significant amount of assets, and (3) an attacker does not need to consider other environmental variables (e.g., software and library version, network traffic analysis, spam or phishing mails to trigger the exploit through a user action).

Thus, smart contracts allow reliable execution of business logic on the blockchain without involving a trusted third party. However, several recent attacks exploited errors in smart contract code and had devastating consequences thereby questioning the benefits of this technology. In particular, it is currently highly challenging to fix errors and deploy a patched contract in time. Instant patching is especially important for smart contracts for two reasons: smart contracts are always online due to the distributed nature of blockchain systems and smart contracts manage considerable amounts of assets, which are at risk and often beyond recovery due to the "code-is-law" principle.

Existing solutions to upgrading smart contracts consist merely of manual or error-prone processes.

SUMMARY

In an embodiment, the present disclosure provides a method for supporting smart contracts in a blockchain network. The blockchain network is a distributed blockchain network having nodes. Each node, of the nodes, that validates transactions runs a virtual machine for executing a smart contract. A contract rewriting framework system is also provided. The contract rewriting framework system has a vulnerability detection tool, a rewriter tool, and a deployment component. The method includes: obtaining, by the deployment component, a permission to upgrade the smart contract, the permission being granted to the deployment component by a creator or owner of the smart contract during a creation phase of the smart contract; retrieving, by the contract rewriting framework system, the smart contract from the blockchain network, the smart contract being passed to the vulnerability detection tool; detecting, by the vulnerability detection tool, a vulnerability in the smart contract, the vulnerability detection tool determining a type of the vulnerability and an instruction location of the vulnerability; rewriting, by the rewriter tool, the smart contract to include a patch for fixing the vulnerability, a patched smart contract being generated by the rewriter tool based on the type of the vulnerability and the instruction location of the vulnerability; and issuing, by the deployment component, an upgrade transaction including the patched smart contract to the blockchain network, such that the patched smart contract is deployed in the blockchain network.

BRIEF DESCRIPTION OF THE DRAWINGS

Subject matter of the present disclosure will be described in even greater detail below based on the exemplary figures. All features described or illustrated herein can be used alone or combined in different combinations. The features and advantages of various embodiments will become apparent by reading the following detailed description with reference to the attached drawings, which illustrate the following:

FIG. 5 is an excerpt of smart contract's code, wherein an integer overflow allows the attacker to bypass business logic checks, resulting in financial loss;

FIG. 8 is a code example illustrating a jump when calling an internal function in solidity;

FIG. 10 is a code listing illustrating the original and patched version of the same bytecode, as produced by the bytecode rewriter according to an embodiment of the invention;

FIG. 11 is a table illustrating a list of CVEs of Ethereum smart contracts which involve exploits of integer overflow/underflow vulnerabilities;

FIG. 12 is a table illustrating amount of overhead in gas consumption of the relevant transaction invocation, and the increase in contract size incurred by the patched contracts according to an embodiment, wherein the number of patches corresponds to what are reported by Osiris and patched by the bytecode rewriter according to the embodiment;

FIG. 13 is a table illustrating an average size of the vulnerable contracts detected by Osiris and the code size increase after the bytecode patch;

FIG. 15 is a code listing illustrating problematic Solidity line in the Hexagon contract (top listing), wherein Solidity generates the Ethereum Virtual Machine (EVM) code in the bottom listing, wherein instead of subtracting 2 from an unsigned integer, Solidity promotes this to an signed integer and adds −2.

DETAILED DESCRIPTION

Figure 1:
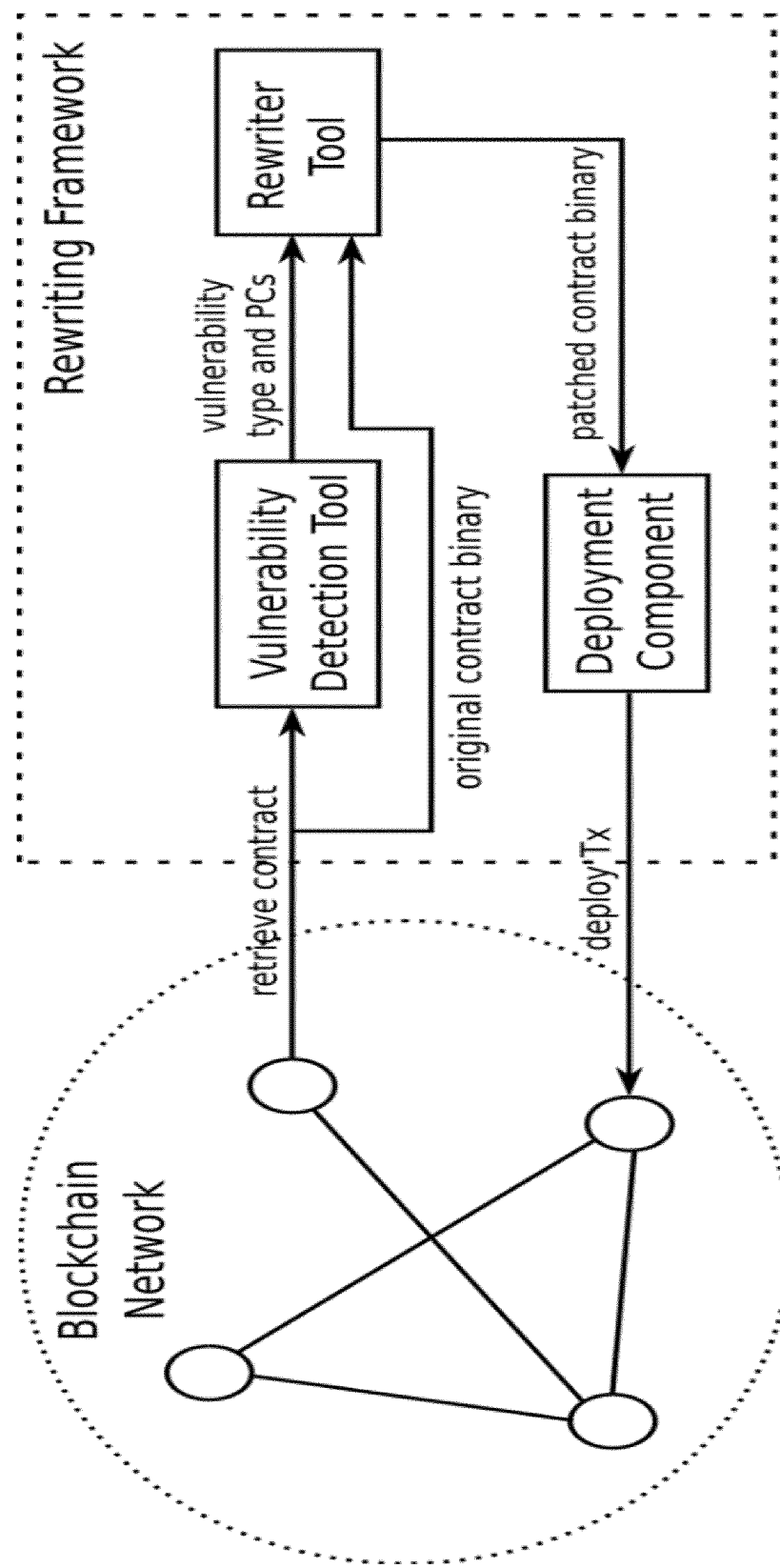
FIG. 1 is a schematic view illustrating a method and a contract rewriting framework system according to an embodiment of the present invention.

In view of the above, embodiments of the present invention improve and further develop a method and a contract rewriting framework system of the initially described type for supporting smart contracts in a blockchain network in such a way that a handling of vulnerable or faulty smart contracts is improved.

In accordance with and embodiment of the invention, a method is provided for supporting smart contracts in a blockchain network, wherein the blockchain network is a distributed blockchain network having nodes, each node that validates transactions runs a virtual machine for executing a smart contract, a contract rewriting framework system is provided, wherein said contract rewriting framework system comprises a vulnerability detection tool, a rewriter tool and a deployment component, the method comprising:

obtaining, by the deployment component, a permission to upgrade a smart contract, wherein said permission is granted to the deployment component by a creator or owner of the smart contract during a creation phase of the smart contract;

retrieving, by the contract rewriting framework system, the smart contract from the blockchain network, wherein the smart contract is passed to the vulnerability detection tool;

detecting, by the vulnerability detection tool, a vulnerability in the smart contract, the vulnerability detection tool determines a type of the vulnerability and an instruction location of the vulnerability;

rewriting, by the rewriter tool, the smart contract to include a patch for fixing the vulnerability, wherein a patched smart contract is generated by the rewriter tool based on the type of the vulnerability and the instruction location of the vulnerability;

issuing, by the deployment component, an upgrade transaction including the patched smart contract to the blockchain network, such that the patched smart contract is deployed in the blockchain network.

Furthermore, an embodiment of the present invention provides a contract rewriting framework system for supporting smart contracts in a blockchain network, wherein the blockchain network is a distributed blockchain network having nodes, each node that validates transactions runs a virtual machine for executing a smart contract, wherein said contract rewriting framework system comprises a vulnerability detection tool, a rewriter tool and a deployment component, wherein the deployment component is configured to obtain a permission to upgrade a smart contract, wherein said permission is granted to the deployment component by a creator or owner of the smart contract during a creation phase of the smart contract, wherein the contract rewriting framework system is configured to retrieve the smart contract from the blockchain network, wherein the smart contract is passed to the vulnerability detection tool, the vulnerability detection tool is configured to detect a vulnerability in the smart contract, the vulnerability detection tool determines a type of the vulnerability and an instruction location of the vulnerability, wherein the rewriter tool is configured to rewrite the smart contract to include a patch for fixing the vulnerability, wherein a patched smart contract is generated by the rewriter tool based on the type of the vulnerability and the instruction location of the vulnerability, and wherein the deployment component is configured to issue an upgrade transaction including the patched smart contract to the blockchain network, such that the patched smart contract is deployed in the blockchain network.

According to the invention, it has first been recognized that an enormous improvement with regard to the handling of smart contracts in a blockchain network can be achieved by timely patching a deployed contract. The blockchain network is a distributed blockchain network having nodes, each node that validates transactions runs a virtual machine for executing a smart contract. According to the invention, a contract rewriting framework system is provided, wherein the contract rewriting framework system comprises a vulnerability detection tool, a rewriter tool and a deployment component. The deployment component obtains a permission to upgrade a smart contract. That is, a creator or owner of the smart contract grants the deployment component a permission to upgrade to contract. This is done during a creation phase of the smart contract. The contract rewriting framework system retrieves the smart contract from the blockchain network, wherein the smart contract is passed to the vulnerability detection tool. The vulnerability detection tool is configured to detect a vulnerability in the smart contract, the vulnerability detection tool determines a type of the vulnerability and an instruction location of the vulnerability. Thus, the rewriter tool can rewrite the smart contract to include a patch for fixing the vulnerability. The patched smart contract is generated by the rewriter tool based on the type of the vulnerability and the instruction location of the vulnerability. Then, the deployment component issues an upgrade transaction including the patched smart contract to the blockchain network, such that the patched smart contract is deployed in the blockchain network.

Thus, embodiments of the present invention provide a method and a contract rewriting framework system for supporting smart contracts in a blockchain network, wherein the handling of vulnerable or faulty smart contracts is improved.

Embodiments of the invention can timely patch any deployed contracts in the blockchain network. A framework according to embodiments of the invention does not require any source code and is independent of any specific compilers. Embodiments may also be compatible with analysis tools that work on the EVM bytecode levels and does not require to move funds manually from the deprecated contracts and back to the new contract.

In the context of an embodiment of the invention, it may be considered that among all the deployed smart contracts in Ethereum, a major class of contracts are the so-called Ethereum Request for Comments 20 (ERC-20) Token contracts. These contracts implement a specified set of interfaces and are used to manage customized sub-currencies on the Ethereum platform. Correctly implementing such a token is major effort though. In the last years various vulnerabilities were found in ERC-20 tokens. The major part of these vulnerabilities was due to integer overflow bugs. Due to the possible financial loss, a smart contract should be patched timely to correct vulnerabilities. However, upgrading smart contracts is not an easy process in permissionless blockchain systems, such as Ethereum. Smart contracts are typically considered immutable once deployed. To upgrade Ethereum smart contracts, the smart contract itself must implement code to facilitate the upgrade. There are multiple upgrade strategies, which are often problematic (cf., e.g., references [7] and [8] as mentioned above). Some frameworks that provides contract upgrading functions such as [9] adopt the practices in [8] by concealing the complexities. Even if the smart contract implements a secure upgrade path, the time until the patch can be rolled out can be rather long. However, embodiments of the present invention may include a contract rewriting framework to automatically patch and upgrade deployed smart contracts in the blockchain. This enables developers to semi-automatically deploy a hardened variant of the smart contract and timely patch possible vulnerabilities.

The term "transaction" is to be understood in the most general sense and refers in particular in the claims, preferably in the specification to information sent or transmitted into the network, e.g. to nodes connected to the node sending said transaction. Said transaction may be provided in form of a message, a data packet or the like and may comprise information for the recipients of said transaction.

The term "blockchain" is to be understood, in particular in the claims, preferably in the description as a distributed database maintaining a continuously growing list of data records that are hardened against tampering and revision even by operators of the data storing nodes hosting database. A blockchain comprises for example two kinds of records: so-called transactions and so-called blocks. Transactions may be the actual data to be stored in the blockchain and blocks may be records confirming when and in what sequence certain transactions became journaled as a part of the blockchain database. Transactions may be created by participants and blocks may be created by users who may use specialized software or equipment designed specifically to create blocks.

The term "network" is to be understood in its broadest sense and refers in particular in the claims, preferably in the specification to at least two entities being connected with each other for communication.

The term "creator" of a smart contract is to be understood in its broadest sense and may refer in particular in the claims, preferably in the specification to an entity that created/developed the code of the smart contract.

The term "owner" of a smart contract is to be understood in its broadest sense and may refer in particular in the claims, preferably in the specification to an entity that owns the private key of the corresponding public key that deployed the contract in the blockchain.

According to embodiments of the invention, it may be provided that the smart contract retrieved by the contract rewriting framework system is a (original) smart contract code of the blockchain network in a binary format, in particular in bytecode.

Bytecode may be compiled code. For example, bytecode may be any piece of compiled code. Furthermore, binary format may be the representation of a string in bits.

According to embodiments of the invention, the patched smart contract, generated/yielded by the rewriter tool, may be a new or modified smart contract code in a binary format, in particular in bytecode. A new smart contract code may mean that the (original) smart contract code is amended in such a way that a detected vulnerability is removed/eliminated from the smart contract.

According to embodiments of the invention, it may be provided that the patched smart contract is generated by preparing a patched code in a binary format, in particular in bytecode, for replacing a vulnerable block of the original smart contract code.

According to embodiments of the invention, it may be provided that the instruction location of the vulnerability includes a program counter.

According to embodiments of the invention, it may be provided that the smart contract, which is retrieved by the contract rewriting framework system from the blockchain network, is passed to the rewriter tool. Then, the rewriter tool may patch the smart contract based on the type of the vulnerability and the instruction location of the vulnerability, such that the patched smart contract is generated.

According to embodiments of the invention, it may be provided that the rewriter tool lifts the smart contract to an intermediate representation while the instruction location of the vulnerability is interpreted. After including a patch code snippet in the intermediate representation, the intermediate representation may be compiled back in a binary format such that the patched smart contract is generated.

According to embodiments of the invention, the rewriter tool may add a patch code snippet to an unused address space, for instance at the end of the smart contract. Further, the rewriter tool may replace a vulnerable code in the smart contract with a trampoline jump such that an instruction pointer jumps to the patch code snippet, which is located at the unused address space of the smart contract. After the patch code snippet finishes its execution, the instruction pointer may jump back to original subsequent code of the smart contract to continue executing of the remaining part of the smart contract. Thus, a vulnerable part of a smart contract can be efficiently fixed/patched.

According to embodiments of the invention, it may be provided that the deployment component of the contract rewriting framework system includes/represents a predetermined account. The predetermined account may be defined and used for upgrading the smart contract of the blockchain network. This can be implemented in such a way that the upgrade transaction is accepted by a node of the blockchain network, from which the smart contract is retrieved, if the upgrade transaction is signed by the predetermined account. The upgrade transaction may be signed with a private key of the predetermined account.

According to embodiments of the invention, it may be provided that a predetermined address for contract deployment is defined, such that a transaction that is sent to the predetermined address is understood as the upgrade transaction for upgrading the smart contract. Thus, the smart contract of the blockchain can be efficiently upgraded.

According to embodiments of the invention, the upgrade transaction may have payload that comprises the patched smart contract and an address. Thus, the smart contract originally retrieved from the blockchain network can be upgraded at address with the patched smart contract.

According to embodiments of the invention, it may be provided that the nodes of the blockchain network, which receive the upgrade transaction, check the original smart contract at address based on the upgrade transaction and retrieve the predetermined account represented by the deployment component.

According to embodiments of the invention, it may be provided that the nodes of the blockchain network verify a signature of the upgrade transaction, wherein the blockchain nodes replace the smart contract at address with the patched smart contract, if the upgrade transaction is valid.

According to embodiments of the invention, it may be provided that the contract rewriting framework system further comprises a patch verifier. In this regard, the rewriter tool may pass the patched smart contract to the patch verifier, wherein the patch verifier extracts transactions that were sent to the original smart contract and re-executes them. Collected execution traces resulting from the original smart contract and the patched smart contract may be compared to verify that they do not lead to different state update, except for those malicious transactions that are reverted by the patched smart contract, such that the patch verifier can confirm consistency of the logic of the patched smart contract. This may be performed prior to preparing the upgrade transaction.

Existing solutions to upgrading smart contracts consist merely of manual or error-prone processes. An embodiment of the present invention aims to tackle this problem by providing a framework system to instantly and automatically patch faulty smart contracts. More specifically, according to an embodiment it is provided a bytecode rewriting engine for the bytecode format of the popular Ethereum blockchain. According to embodiments, the corresponding proof-of-concept implementation may automatically patch smart contracts that are vulnerable to the major bug class of integer overflows. The approach may successfully block all attack transactions launched on these contracts, while keeping normal functionality of the contract intact.

According to embodiments of the invention, the problem of automated and timely patching of smart contracts is addressed to aid developers to instantly take action on reported smart contract errors. The design and implementation of a patching framework that features a bytecode-rewriter (as rewriter tool) for smart contracts in Ethereum is provided. A contract rewriting framework system according to an embodiment may utilize the bytecode-rewriting engine to ensure that patches are minimally intrusive and that the newly patched contract is compatible with the original contract. It is noted that by applying patches on the bytecode level, the contract rewriting framework system can be independent of the used compiler and compiler version. That is, the contract rewriting framework system supports any commercial-off-the-shelf smart contract code.

An embodiment of the present invention may perform one or more of the following steps:

During a smart contract creation phase, the creator (or contract owner) grants an account A the permission to upgrade the smart contract. The account A in this case is the deployment component of the contract rewriting framework system.

The contract rewriting framework systems retrieves the binary code of a newly created contract at address from the blockchain network and passes the binary code to one or more vulnerability detection tools.

The one or more vulnerability detection tools apply static or dynamic analysis on the smart contract, and output i) the type of each detected vulnerability; and ii) the instruction location of each detected vulnerability (i.e., e.g., the program counter 'PC').

The vulnerability analysis outputs are sent to the rewriter tool along with the original smart contract code. The rewriter tool locates the vulnerable block, patches the vulnerable block (by, e.g., inserting necessary checks) and adds the patched block to the end of the contract or any unused address space. The rewriter tool replaces the beginning of the vulnerable block with a trampoline jump, which jumps to the patched block. The rewriter tool yields the patched contract binary C' and passes it to the deployment component.

The deployment component sends an upgrade transaction $Tx_{upgrade}$ to address 0x1 with payload (C', Addr) signed with the private key of account A.

The blockchain nodes check the contract at address and retrieve the privileged upgrading account A.

The blockchain nodes verifies the signature of the upgrade transaction $Tx_{upgrade}$.

If the transaction is valid, the blockchain nodes replace the code at address with C'.

Furthermore, at least one embodiment of the invention may have one or more of the following features and characteristics:

A design and implementation of a smart contract patching framework is provided, enabling instant patching of Ethereum smart contracts without requiring access to source code.

An instantiation of an end-to-end automatic patch generation tool is provided based on a bytecode rewriter (as rewriter tool) for smart contracts to patch integer overflow vulnerabilities.

Embodiments of the present invention may support patching of different classes of vulnerabilities.

Instrumenting smart contract code with a jump instruction to a new code that fixes identified vulnerabilities.

Adjusting smart contracts at contract creation time to allow for upgrading the contract.

There are several ways how to design and further develop the teaching of the present invention in an advantageous way. To this end, it is to be referred to the patent claims subordinate to patent claim 1 on the one hand and to the following explanation of further embodiments of the invention by way of example, illustrated by the figure on the other hand. In connection with the explanation of the further embodiments of the invention by the aid of the figure, generally further embodiments and further developments of the teaching will be explained.

FIG. 1 shows a method and a contract rewriting framework system according to an embodiment of the present invention. The embodiment of FIG. 1 assumes a distributed blockchain network where each node who validates transactions runs a virtual machine that executes the corresponding smart contracts. The contract rewriting framework system as disclosed by FIG. 1 is loosely connected to one or multiple validating nodes of the blockchain network to retrieve deployed smart contracts in the blockchain. The retrieved smart contracts are in their binary format (e.g., bytecode in Ethereum blockchain). The original smart contract binary is then fed to one or multiple vulnerability detection tools. The vulnerability detection tools may apply static or dynamic analysis on the contract, and can output i) the type of each detected vulnerability; and ii) the instruction location of each vulnerability, i.e., the program counter (PC). The vulnerability analysis outputs are then sent to the rewriter tool along with the original smart contract code. The rewriter tool inserts the corresponding patches at the given instruction locations and returns the patched contract binary as patched smart contract, which can then be prepared by the deployment component to be re-deployed in the blockchain network. This can be done in the form of a upgrade transaction Tx.

Figure 2:
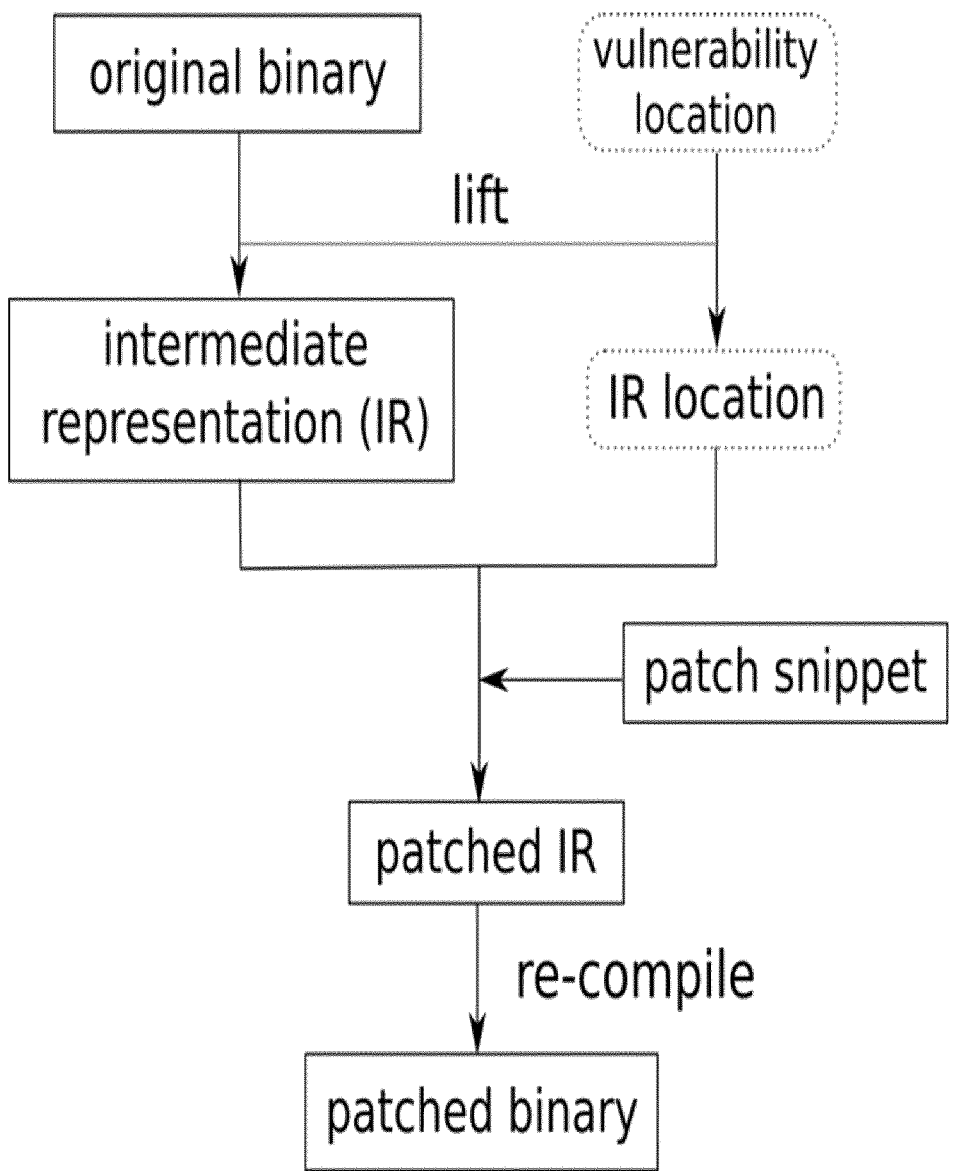
FIG. 2 is a block diagram of an exemplary intermediate representation approach according to an embodiment of the invention, wherein the rewriter tool can lift the original binary, i.e. the original smart contract, to an intermediate representation and patch the code.

FIG. 2 shows an exemplary intermediate representation approach according to an embodiment of the invention, wherein the rewriter tool can lift the original binary, i.e. the original smart contract, to an intermediate representation and patch the code of the smart contract. According to embodiments, the binary re-writer tool can be implemented with multiple rewriting strategies. With respect to the embodiment shown in FIG. 2, the rewriter tool can first lift the original binary of the smart contract to an intermediate representation (IR), while the instruction location of the vulnerability is also interpreted. After inserting the patch snippet in the lifted intermediate representation (IR), the patched IR is then compiled back to the binary, i.e. the patched binary.

Figure 3:
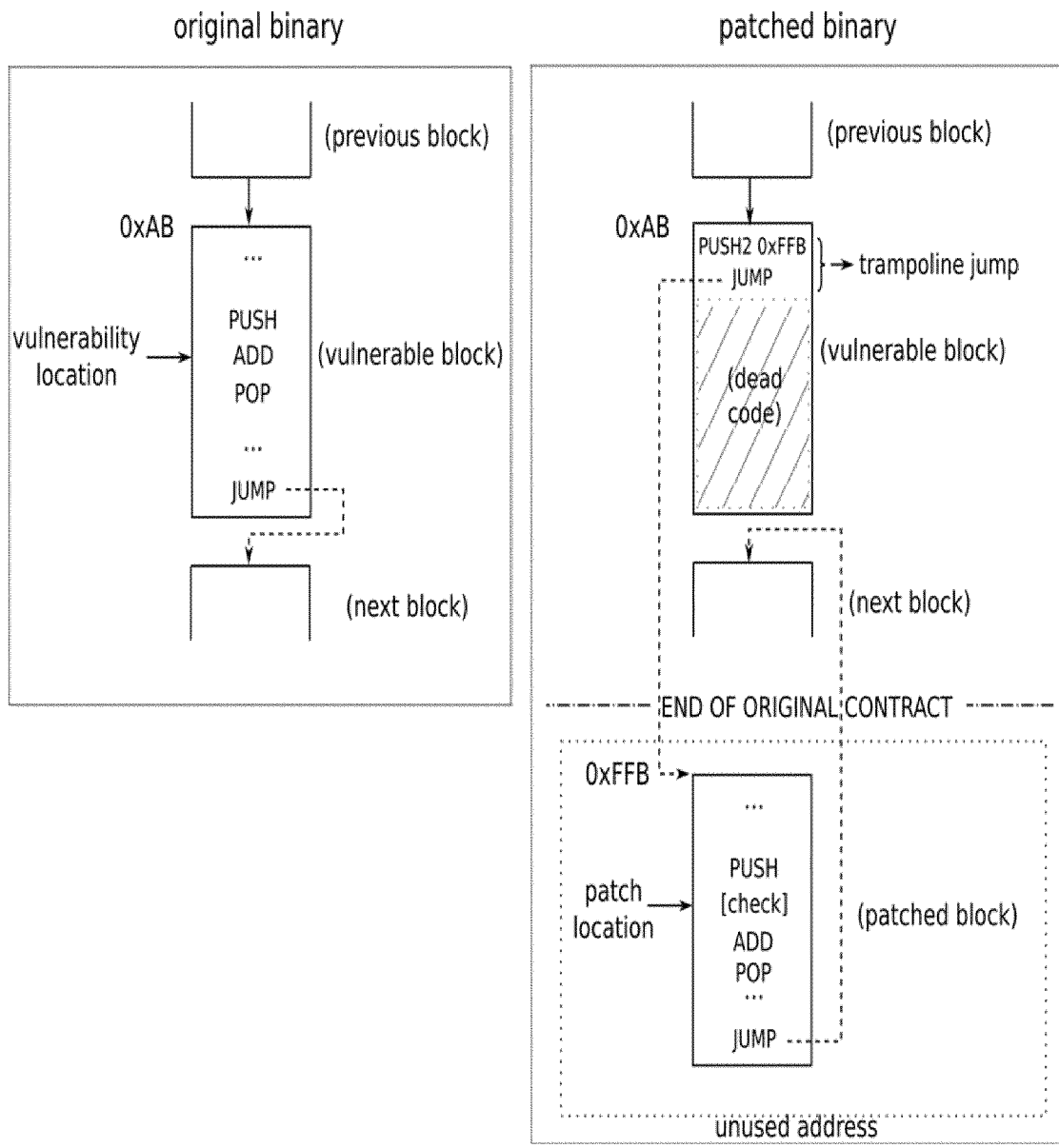
FIG. 3 is a schematic of an exemplary trampoline approach according to an embodiment of the invention, wherein the rewriter tool can replace the vulnerable block of the smart contract with a trampoline jump, which links to the patched block at the end of the smart contract.

FIG. 3 shows an exemplary trampoline approach according to an embodiment of the invention, wherein the rewriter tool can replace the vulnerable block of the smart contract with a trampoline jump, which links to the patched block at the end of the smart contract. According to the embodiment illustrated by FIG. 3 (all embodiments disclosed herein may be combined into a single embodiment), the rewriter tool adopts a trampoline strategy. More specifically, and referring to FIG. 3, the rewriter tool first copies all patched code snippets to the end (at unused address) of the original smart contract, and replaces the vulnerable code with a trampoline jump, which jumps to the patch snippets. After the patch snippet finishes execution, the instruction pointer jumps back to the original subsequent code to continue executing the remaining part of the smart contract.

After the rewriter tool generates the patched code, the deployment component prepares the patched code and re-deploys it to the blockchain in the form of a transaction. It is noted that the possibility of upgrading contracts may depend on the underlying blockchain platform. For example, in the case of Ethereum, the following features can extend the Ethereum platform:

Include a special account A for upgrading the contract C during the contract creation phase, so that subsequent upgrading requests for contract C signed by A will be accepted.

Include a special address for contract deployment such as 0x1, so that transactions sent to 0x1 and have payload (C', Addr) are understood as a request to upgrade the contract at address with binary C'.

Then, according to an embodiment a contract C at address can be upgraded as follows:

During the smart contract creation phase, the creator (or contract owner) grants account A the permission to upgrade the contract. If there are many contract owners, these can issue signatures to allow the contract to be upgraded. The account A in this case can be represented by the deployment component of the contract rewriting framework system.

The contract rewriting framework system patches the contract C to fix the vulnerabilities and yield new (patched) contract code C'.

The contract rewriting framework system sends an upgrade transaction $Tx_{upgrade}$ to address 0x1 with payload (C',Addr) signed by account A.

The blockchain nodes check the contract at address and retrieve the privileged upgrading account A.

The blockchain nodes verifies the signature of the upgrade transaction $Tx_{upgrade}$.

If the transaction is valid, the blockchain nodes replace the code at address with patched contract code C'.

Because upgrading a contract may require consent from multiple parties and may adoption by stakeholders, disclosed embodiments can use multiple accounts as the privileged upgrading account. As such, the contract creation transaction can specify a multi-signature or threshold signature from multiple accounts to upgrade the contract. Moreover, to allow all validating nodes in the consensus layer to participate in the voting of the contract upgrade process, disclosed embodiments can include a quarantine stage in which the contract upgrading transactions are not immediately included in the blocks, but rather the system will notify the validator who can then decide whether to upgrade the contract or not.

Through the above technology, smart contracts can be modified to enable contract upgrading. Upgrading can be performed by instrumenting or inserting smart contract code with a jump instruction to a new code that resolves vulnerabilities.

Disclosed embodiments may include a processing system configured to perform a method. The method may include the following blocks:

Block 1: During the contract creation phase, the creator (or contract owner) grants an account A or multiple accounts {A_i} the permission to upgrade the contract by defining an upgrading condition in the contract creation transaction.

Block 2: The contract rewriting framework retrieves the binary code of a newly created contract at address from the blockchain network and passes the binary to one or multiple vulnerability detection tools.

Block 3: The vulnerability detection tools apply static or dynamic analysis on the contract, and output i) the type of each detected vulnerability; and ii) the instruction location of each vulnerability, i.e., the program counter (PC).

Block 4: The vulnerability analysis outputs are sent to the rewriter tool along with the original contract code. The rewriter tool applies the relevant code rewriting method and yields the patched binary C' and passes it to the patch verifier.

Block 5: The patch verifier extracts the transactions that were sent to the original contract and re-executes them. The collected execution traces resulting from the original contract and the patched contract are compared to verify that they do not lead to different state update, except for those malicious transactions that are reverted by the patched contract.

Block 6: After the patch verifier confirms the consistency of the logic of the patched contract, it prepares an upgrade transaction $Tx_{upgrade}$ targeting to a special address such as '0x1' with the payload (C',Addr) and sends it to the stakeholders of the related accounts {$A_i$}.

Block 7: The stakeholder checks the new contract C', and if he agrees with the upgrade, he signs the transaction $Tx_{upgrade}$ with the account public key of $A_i$, potentially using multi-signature or threshold signature scheme, and broadcasts the signed transaction to the blockchain network.

Block 8: The blockchain nodes retrieve the original contract at address based on $Tx_{upgrade}$ along with the upgrading condition involving the permissioned accounts {$A_i$}. The blockchain nodes verifies the signature of the upgrade transaction $Tx_{upgrade}$, if its signature fulfills the upgrading condition defined by the corresponding contract creation transaction.

Block 9: If the transaction is valid, the blockchain nodes replace the code at address Addr with C'.

Embodiments of the invention (i.e., disclosed systems and methods) can timely patch smart contracts deployed within a blockchain network. Embodiments of the invention (i.e., methods and correspondingly configured systems) do not require any source code and are independent of any specific compilers. The embodiments can be compatible with analysis tools that operate on EVM bytecode levels. According to some embodiments, there is no need to revert assets during the upgrade. Disclosed embodiments enable revisions to a subject smart contract without altering the subject smart contract's address and thereby corrupting references, in external smart contracts, to the subject smart contract.

Figure 4:
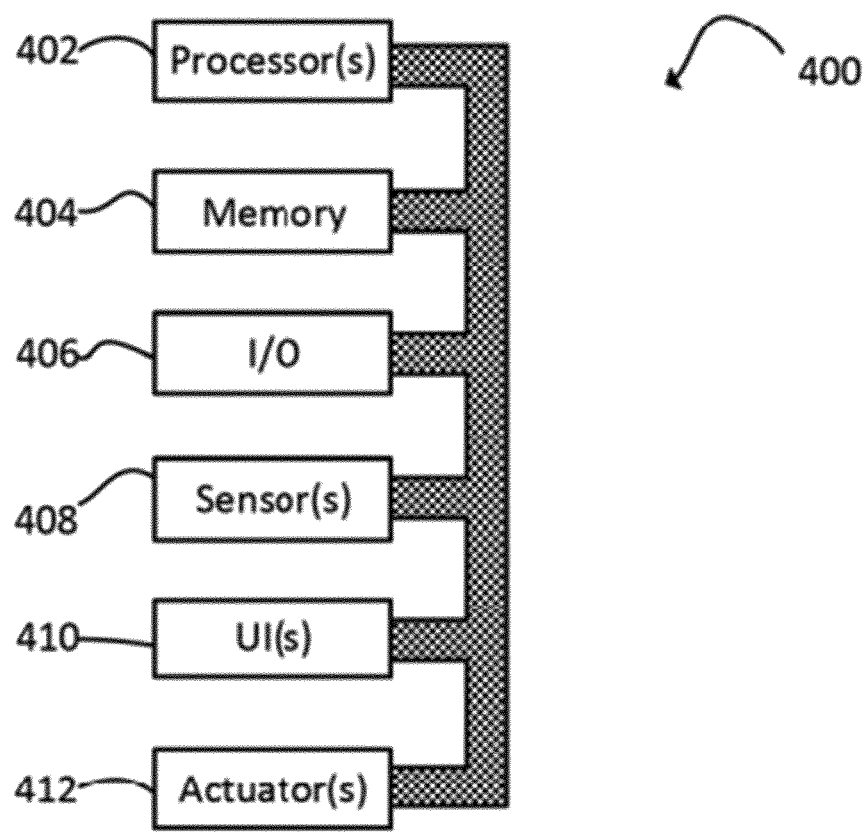
FIG. 4 is a block diagram of an exemplary processing system, wherein the processing system can be configured to perform any operations (e.g., frameworks, methods, etc.) disclosed in the present application, in particular to perform any operations of a contract rewriting framework system for supporting smart contracts in a blockchain network according to an embodiment of the invention.

Referring to FIG. 4, processing system 400 can include one or more processors 402, memory 404, one or more input/output devices 406, one or more sensors 408, one or more user interfaces 410, and one or more actuators 412.

Processors 402 can include one or more distinct processors, each having one or more cores. Each of the distinct processors can have the same or different structure. Processors 402 can include one or more central processing units (CPUs), one or more graphics processing units (GPUs), circuitry (e.g., application specific integrated circuits (ASICs)), digital signal processors (DSPs), and the like. Processors 402 can be mounted on a common substrate or to different substrates.

Processors 402 are configured to perform a certain method (i.e., framework, function, operation, etc.) at least when one of the one or more of the distinct processors is capable of executing code (including scripts), stored on memory 404 embodying the function, method, or operation. Processors 402, and thus processing system 400, can be configured to automatically perform any and all functions, methods, and operations disclosed herein. Thus, any user identified herein can be embodied as a processing system configured to automatically perform the operations associated with the user.

When the present disclosure states that processing system 400 performs/can perform task "X", a user performs task "X", or task "X" is performed, such a statement should be understood to disclose that processing system 400 can be configured to perform task "X". Processing system 400 are configured to perform a function, method, or operation at least when processors 402 are configured to do the same.

Memory 404 can include volatile memory, non-volatile memory, and any other medium capable of storing data. Each of the volatile memory, non-volatile memory, and any other type of memory can include multiple different memory devices, located at multiple distinct locations and each having a different structure.

Examples of memory 404 include a non-transitory computer-readable media such as RAM, ROM, flash memory, EEPROM, any kind of optical storage disk such as a DVD, a Blu-Ray® disc, magnetic storage, holographic storage, an HDD, an SSD, any medium that can be used to store program code in the form of instructions or data structures, and the like. Any and all of the methods, functions, and operations described in the present application can be fully embodied in the form of tangible or non-transitory machine-readable code (e.g., scripts) saved in memory 404.

Input-output devices 406 can include any component for trafficking data such as ports, antennas (i.e., transceivers), printed conductive paths, and the like. Input-output devices 406 can enable wired communication via USB®, Display-Port®, HDMI®, Ethernet, and the like.

Input-output devices 406 can enable electronic, optical, magnetic, and holographic, communication with suitable memory 406. Input-output devices 406 can enable wireless communication via WiFi®, Bluetooth®, cellular (e.g., LTE®, CDMA®, GSM®, WiMax®, NFC®), GPS, and the like. Input-output devices 406 can include wired or wireless communication pathways.

Sensors 408 can capture physical measurements of environment and report the same to processors 402. User interface 410 can include displays (e.g., LED touchscreens (e.g., OLED touchscreens), physical buttons, speakers, microphones, keyboards, and the like. Actuators 412 can enable processors 402 to control mechanical forces.

Processing system 400 can be distributed. Processing system 400 can have a modular design where certain features have a plurality of the aspects shown in FIG. 4. For example, I/O modules can include volatile memory and one or more processors.

With regard to further embodiments described and illustrated in connection with FIGS. 5 to 15 of the drawing, further features and advantages are disclosed or may become apparent in the following:

EVM & Smart Contracts

At the core of the Ethereum blockchain system lies a custom virtual machine, dubbed Ethereum Virtual Machine (EVM), which executes Ethereum smart contracts. EVM consists of a simple stack-based virtual machine with a custom instruction format. Every instruction is represented as a one-byte opcode. Arguments are passed on the data stack. The only exception are the push instructions, which are used to push constants onto the stack. These constants are encoded directly into the instruction bytes.

In the Ethereum network, a smart contract must be executed by every miner and every full node in the network to compute and verify the state before and after a block. To incentivize miners to properly execute all smart contracts, EVM features a mechanism to limit the execution time per smart contract and reward miners for executing smart contracts. Every EVM instruction has a fixed gas budget, which is required to execute the instruction. This gas has to be paid for by the origin of every transaction. The origin of the transaction, which is always a user-controlled externally owned account, can supply a gas-price with the transaction, which determines how much Ether is spent per gas unit. This means that minimizing the gas cost of a contract's execution is important to reduce to the cost of using smart contracts and to reduce the overall load on the system. As such, any additional code introduced by security hardening checks must be small enough to not induce considerable gas overhead Smart contracts are developed in an object-oriented fashion. Every smart contract has a defined interface of functions: the contract's ABI (Application Binary Interface). Ethereum users and other smart contracts can then call the contract according to the ABI. Whenever a smart contract wants to call another smart contract, it utilizes one of the call instructions, such as CALL or STATICCALL. The called contract will then process the provided input and will update its own state accordingly. A contract can not directly access the state of other contracts and must always use function calls according to the ABI to retrieve state from another contract. While existing programming languages, such as Solidity, offer an object-oriented model with contracts calling function of other contracts with a method-like syntax, these calls are more like remote procedure calls between separate processes than function calls in other programming languages.

Recently, the Ethereum developers introduced a WebAssembly based virtual machine for the Ethereum blockchain. This virtual machine is a deterministic version of WebAssembly, called eWASM, that is compatible with the EVM execution model. This allows developers to utilize other programming languages that compile to WebAssembly for developing Ethereum smart contracts, while still interoperating with existing contracts for the old EVM. However, embodiments of the invention may focus on rewriting legacy contracts which were developed and compiled for the current EVM. As the eWASM virtual machine is not yet enabled on the main Ethereum blockchain, there are no eWASM smart contracts utilized in production in Ethereum, which makes it impossible to obtain useful data (smart contracts and corresponding transactions).

Binary Rewriting

Binary rewriting is a technique to optimize or instrument programs after compilation. Binary rewriting has also been applied to retrofit security hardening techniques such as control-flow integrity, to compiled binaries, but also to dynamically apply security patches to running programs. For binary rewriting on traditional architectures, such as x86 or ARM, two flavors of approaches have been developed: static binary rewriting and dynamic binary rewriting. The latter is often also called dynamic binary translation or instrumentation.

However, dynamic binary instrumentation rewrites code on the fly, while the code is executing. This avoids having to perform imprecise static analysis on large binaries. In practice, this approach typically has less problems, than static rewriting approaches, when dealing with big application binaries and multiple libraries. One popular framework for dynamic binary instrumentation is the Valgrind. However, dynamic binary translation requires an intermediate layer, which analyzes and rewrites code at runtime. Since the Ethereum Virtual Machine does not support dynamic code generation or modification, it is not possible to apply this approach to Ethereum smart contracts.

The other flavor of binary rewriting is static binary rewriting. Static binary rewriting works completely offline and relies on static analysis to recover enough information about the target to accurately rewrite it. As such, there is no runtime component, which analyzes the code of the rewriter at runtime. However, static binary rewriting often produces binaries with additional runtime overhead due to sub-optimal code. Static binary rewriting has been utilized to insert code for optimization, introspection, and applying security defenses.

Smart contracts, as they are used on the Ethereum blockchain, are well suited for static binary rewriting techniques. Smart contracts compiled for the EVM and deployed in the Ethereum, have comparably small code size. Furthermore, EVM smart contracts are always statically linked to all libraries. Something similar to dynamic libraries is implemented with special call instructions, which switch the code address space of the executing contract. In this case the rewriter can be applied to both the contract and the library contract separately. This makes smart contracts a good target for static binary rewriting.

Integer Overflow Vulnerabilities

Typical integer types have some minimum or maximum size, which result from a fixed bit-width of the integer type. However, programmers often do not consider this limitation of the actual integer type and do not handle edges cases regarding the integer value range. This then leads to integer bugs. For example, an integer overflow occurs when the result of an arithmetic operation is actually bigger than the maximum size of the integer type. The result is then truncated to the bit width of the integer types. This behavior is often even specified, such that on most architectures unsigned integer addition is specified as addition modulo $2^{bit_{width}}$. This leads to unexpected situations, where the result of an addition can be smaller than the two operands.

Mishandling integer types can have disastrous consequences. For example, the infamous "Stagefright" vulnerability on Android systems was due to an integer overflow. This integer overflow allowed the attacker to bypass bounds-checking and corrupt memory, ultimately leading to remote code execution. As such, dealing with integer bugs on classical systems and especially in C/C++ programs is an active topic of research.

Some high-level programming languages, such as Python or Scheme, are immune to integer bugs, since they automatically promote integers to arbitrary precision integers with virtually unlimited size. However, the de-facto standard programming language for smart contracts—Solidity — does not automatically handle integer overflows and related issues. This leaves the burden with the developer. Similar to legacy code in C/C++, this lead to vulnerabilities in smart contracts, when the developer forgot to consider the possibility of integer bugs. Recently, this has led to multiple vulnerabilities in ERC-20 token contracts. These token contracts manage subcurrencies, so called Tokens, on the Ethereum blockchain. Such tokens can deal with large amounts of currency, since they track the token balance of every token owner and also handle exchanging tokens and Ether. For instance, the BEC token contained an integer overflow vulnerability. FIG. 5 shows an excerpt of the contract's code. While computing the total amount in line 8 an unchecked integer multiplication is used. During the attack the attacker provided a very large value, which resulted in an integer overflow. The amount variable then contained a very small amount. This effectively bypassed the check on line 11, which verifies that the balance of the attacker is high enough to transfer the requested tokens as specified in the value parameter. This allowed the attacker to transfer a large amount of Tokens to an attacker controlled account and exchange the tokens for Ether.

Because Solidity does not integrate checked integer arithmetic, smart contract developers have to either implement overflow checks themselves or include the generally recommend SafeMath Solidity library. However, such manual integer overflow checking is prone to errors. As such, tools based on symbolic execution and formal verification have been proposed to scan smart contracts for integer bugs.

Currently, Ethereum treats the code of smart contracts as immutable once they are deployed on the blockchain. The only change that is allowed to the code is deletion, which can be achieved by the contract itself using the SELFDESTRUCT instruction. As a consequence, Ethereum does not currently offer platform support for updating smart contracts. As a workaround, the community came up with several workarounds for dealing with bugs in deployed smart contracts and patching smart contracts. However, it is not yet clear what the best practice for developing upgradable contracts is. Currently the Ethereum community is experimenting with various implementations of upgradable contracts.

One commonly used feature is to implement functionality in the contract, which allows an administrator to pause all operations of the smart contract. Then in case of becoming aware of a critical bug, the administrator will pause the smart contract and freeze the current state of the contract. The contract is then implemented in such a way that all state-changing functionality will revert the transaction instead of updating the internal state. The state of the contract can still be inspected and it still holds all funds. This allows an administrator to issue an emergency stop to the contract's operations, which will also stop an attacker from exploiting the contract. This functionality is already part of the OpenZeppelin Solidity libraries and considered best practice for smart contract development. Once the administrator paused the contract, an upgrade strategy needs to be implemented to upgrade to a patched version of the contract.

Migration to a new contract: The first upgrade strategy is to migrate to a newly deployed contract. The patched contract is deployed on the blockchain at a separate new address with a fresh and clean state. The administrators of the contract then need to inspect the state of the old contract and manually migrate all relevant state to the new contract. The state migration is specific to the contract and must be manually implemented by the developers of the contract. First, the contract developers need to ensure that all internal state that needs to be migrated is accessible to them. While by design all state of a smart contract is public, it is not in an easily accessible format. By using the Events facility of the EVM it is possible to log all important actions of the smart contract, which makes it easier to recover the state of the contract. Second, the contract developers need to be able to transfer the old state of the legacy contract to the newly deployed contract.

Migration has two major disadvantages: First, since a new contract is deployed the address changes. This means that all involved parties must immediately switch to the newly deployed contract, as soon as the migration is finished. Second, migration can become a costly operation, when the contract keeps a lot of data in its internal state. Writing the state to the new contract requires one or more transactions that potentially process a large amount of data, which must be paid for in terms of gas. However, for typical contracts, such as ERC-20 tokens, it was shown that the amount of money held by the contracts dwarfs the cost of a migration.

The biggest problem with the migration strategy is that it involves contract-specific off-chain operations. The developers need to implement and test the migration strategy to ensure no data is lost in the process. This means that migration itself is a complex and highly challenging process.

Upgradable contracts with the proxy pattern: The second upgrade strategy is a little more involved on the EVM level, but allows a contract to keep its address and internal state during an upgrade. This reduces the cost and complexity of an upgrade. However, this comes at the cost of increased code complexity of the contracts. Upgradable contracts are typically realized with the proxy pattern. Here the business logic and data storage are split into multiple different contracts. The most favorable version of the proxy pattern is the delegatecall-proxy, which is also used to upgrade contracts in the ZeppelinOS project. The delegatecall-proxy pattern utilizes two different contracts. The first contract is an immutable proxy contract, which holds all funds and also stores all internal state. However, the proxy contract does not implement any of the business logic. Instead the proxy contract forwards all function calls to a separate logic contract using the DELEGATECALL instruction. This instruction executes the code of the logic contract in the context of the calling contract, i.e., the proxy contract. This allows the logic contract to access all internal state and the funds stored in the proxy contract. The proxy contract must only store the address of the logic contract and offer functionality to let the contract owner change this address.

However, the proxy pattern has significant technical depth, because it is currently not very well supported in the Ethereum development ecosystem. For example, Solidity does lacks support for this pattern. As such special care must be taken when developing upgradable contracts. For example, it is not possible to simply re-order or remove variables, as Solidity lays out variables one after another in the storage of a smart contract. Re-ordering a variable would corrupt the internal state of the contract, since now the legacy and the new contract have different storage layouts. Some static analysis tools try to assist the developer in detecting such violations.

Timely Patching: The time between being notified of a vulnerability and issuing a patch is critical for any system, and especially so for smart contracts. To timely patch a smart contract only the call-proxy pattern is currently a viable option. However, correctly utilizing this upgrade pattern is highly challenging for the developer. According to embodiments of the invention, the usage of the delegatecall-proxy may be simplified by applying patches independently of the used compiler. Embodiments of the invention propose a bytecode-rewriting approach to apply patches to smart contracts. Using bytecode rewriting it is possible to ensure compatibility to the legacy contract by design. Since the bytecode rewriter operate on the EVM level, it is not dependent on any Solidity compiler details and naturally replicates the exact same storage layout as the original contract. This makes it possible to apply patches in a timely manner and without risking a broken smart contract.

Integer Overflow Hardening as discussed above in Section I., integer bugs and especially integer overflows are a big class of vulnerabilities, which affect many contracts. The prevalent programming language for EVM smart contract is Solidity and it does not feature checked arithmetic by default. While this sounds like a problem easily fixed in the Solidity compiler, it is not possible to simply enable integer overflow checks for every arithmetic instruction. Integer overflow checks are rather expensive due to the simplistic feature-set of the EVM. As such, it is not possible to augment every arithmetic instructions with an overflow check. However, prior work showed that typically only a limited number of arithmetic instructions are prone to overflows. As such, it is possible to selectively harden those arithmetic instructions that are reported as possibly vulnerable by existing analysis tools. Embodiments of the invention may show automatic patching of possible integer overflow vulnerabilities as a specific usecase for a bytecode rewriting based patching framework.

Figure 6:
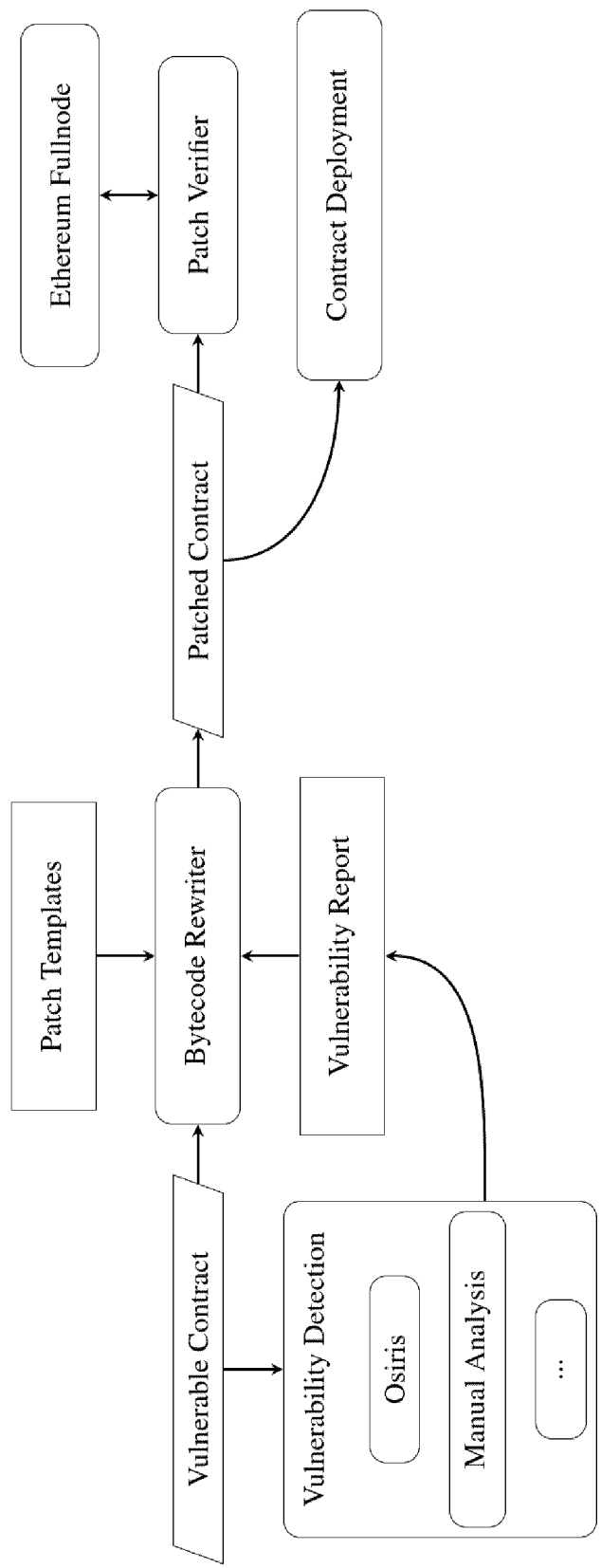
FIG. 6 is a schematic view illustrating an overview of an automated patching process according to an embodiment of the invention.

Embodiments of the invention may provide an automated patching process to timely patch and harden smart contracts. Embodiments of the invention may utilize a bytecode rewriter to apply minimally intrusive patches to EVM smart contracts on the bytecode level. By design, the bytecode rewriter ensures storage layout compatibility between the original contract's code and the rewritten contract. As such, it is easy to apply patches to a smart contract. When new attack types are discovered or bug finding tools become better, the contract can be automatically checked, patched and redeployed in a short amount of time and without developer intervention. FIG. 6 shows an overview of an automated patching process according to an embodiment. There are 4 major components to the patching process: the vulnerability detection, the bytecode rewriter, the patch verification and contract deployment. More specifically, FIG. 6 shows an architecture of the bytecode-rewriting based process for automated patch generation for smart contracts according to an embodiment. This process is run by the developer. As input the bytecode rewriter takes the vulnerable contract, a special machine-readable vulnerability report and a patch template. The bytecode rewriter then creates a patched version of the contract. This patched version is then verified by replaying and comparing historic transactions. Finally the patched contract can be deployed using the upgrade path of a contract using the call-proxy pattern.

Vulnerability Detection: First a vulnerability must be detected in the targeted smart contract. Vulnerability detection can be performed using generic vulnerability detection tools. In an implementation according to an embodiment, the OSIRIS symbolic execution engine may be utilized to detect integer overflow and underflow bugs. However, also other tools based on static analysis or symbolic execution can be easily integrated into the system. A developer or security consultant can also manually specify or review vulnerability reports. In the system according to an embodiment of the invention, the vulnerability detection may be responsible to identify the exact address of the instruction, where the vulnerability is located, and the type of vulnerability. This information is then passed to the bytecode rewriter.

Bytecode Rewriter: The bytecode rewriter takes the bytecode of the vulnerable contract and the vulnerability report and then rewrites the vulnerable contract to include a patch. The rewriter selects a patch template according to the vulnerability type and then specializes the patch template for the given contract.

Patch Verifier: To ensure that the generated patched contract is still functionally correct, the patch verifier re-executes all existing transactions and verifies that all transactions behave consistently. The patch verifier then outputs a list of transactions, where the original and patched code behave differently. These transactions are considered as possible attacks. The developer must then verify that the transactions are malicious. If one of the transactions is benign, then the generated patched contract is faulty.

Contract Deployment: Embodiments of the invention may propose a delegatecall-proxy based upgrade scheme similar to the one developed as part of ZeppelinOS. Embodiments may separate the contract into a proxy contract, whose address is constant and which stores all persistent state, and into a logic contract, which contains the actual code implementing the business logic. The scheme may then deploy the newly patched contract and may switch the logic contract from the old vulnerable version to the newly patched version.

Embodiments of the invention may provide a tool to rewrite the bytecode of Ethereum smart contracts. According to embodiments, the bytecode rewriter may support inserting, removing and overwriting of instructions in smart contracts compiled for the Ethereum Virtual Machine (EVM). This allows to insert automatically generated patches into smart contracts.

Figure 7:
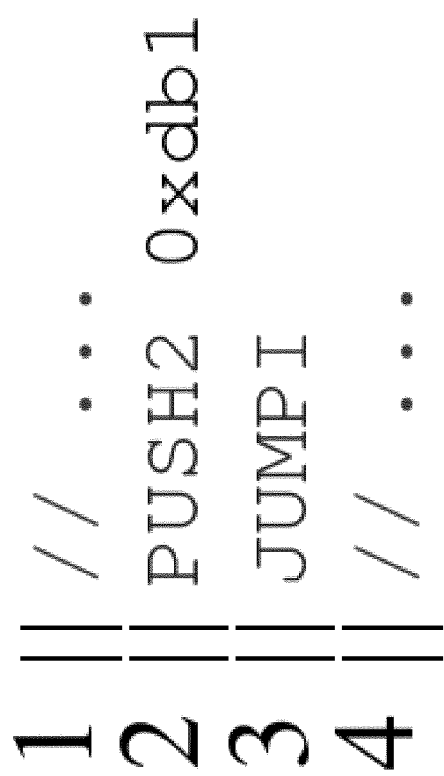
FIG. 7 is a code example illustrating a typical jump to constant target using a push instruction, which directly precedes the jump instruction.

The stack based architecture of the EVM makes static analysis challenging. As jump targets are also passed on the stack, every jump becomes an indirect jump. Simple heuristics can be used for the majority of jumps, where the jump target is pushed onto the stack inside of the same basic block. For example, FIG. 7 shows a jump instruction that is immediately preceded by a push instruction. This means that the top of the stack is the constant value, which is encoded into the push instruction's bytes. Then the jump target is the constant value from the push instruction. However, especially when using internal function calls, the solidity compiler generates code that contains more complicated control-flow constructs.

For example, FIG. 8 depicts code that is typical for internal functions calls as generated by the solidity compiler. Here the basic block must be emulated to identify the jump target as a constant that is pushed on the stack. Line 2 contains the actual address of the jump target. Line 3 to 5 are instructions, that swap stack words, following a masking of the actual jump target in Lines 6 and 7. Even more problematic is the code pattern generated by Solidity to emulate returns from internal functions. Solidity utilizes the normal jump instruction to emulate a function return. In this case the source of the jump target is a push located at each callsite of the internal function and the jump target has multiple possible constant values.

Recovering the jump targets of indirect jumps has been previously studied in the context of the x86 architecture. Similar techniques have been applied to control-flow graph recovery on the EVM. For example, abstract interpretation has been applied to determine possible jump targets using e.g., value-set analysis. Other works use similar algorithms modeling stack effects and executing parts of the program. Similarly partial symbolic execution has been applied to recover jump targets. Others applied a Datalog based engine to accurately recover a control-flow graph. Generally most approaches first perform a local analysis on basic blocks and then incrementally refine the control-flow graph until a fixed-point is reached. Rewriting bytecode is not straight forward for binary or bytecode formats that use addresses to mark locations in the code. When modifying bytecode the rewriter must ensure that any address-based references inside the code are fixed, such that they still refer to the correct address after rewriting. In that sense rewriting EVM bytecode is similar to rewriting binary code for normal CPU instruction set-architectures, such as x86 or ARM. For the EVM bytecode one can classify two types of instructions that use addresses to access the code address space.

Code Jumps: The EVM has two branching instructions: JUMP and JUMPI. Both take the destination address as a first parameter on the stack. Due to the stack-based architecture of the EVM it is not trivial to identify the source of the address, as every jump is turned into an indirect jump.

Constant Data References: The CODECOPY instruction can be used by a contract to copy data from the code address space into the memory address space. This is used when large data constants are used in the smart contract. Such data constants include strings used by the contract, but also the constructor code for new smart contract, when the running contract uses the CREATE or CREATE2 instructions to instantiate new smart contracts. Similar to the jump instructions, the address at which memory is loaded is passed to the CODECOPY instruction via the stack. Determining the value of this address faces the same issues as determining jump targets.

When rewriting an EVM smart contract, both types of instructions need to be considered in the bytecode rewriter. The obvious strategy to rewrite smart contracts is to fix-up all constant addresses in the code to reflect the new addresses after patching the code. However, this strategy is challenging due to two primary reasons. First, it requires accurate recovery of the smart contract's control-flow graph. Second, it requires data-flow analysis to determine which instructions are the sources of the address constants. In the research area of binary rewriting of traditional architectures a more practical approach to rewriting has been developed. Embodiments of the invention may follow the trampoline approach to binary rewriting, which has been previously used for binary rewriting. Instead of fixing up addresses, embodiments of the invention may leave all original code and data addresses as is and append code to the existing contract. Embodiments of the invention may replace the basic blocks, which are needed to patch with a trampoline that immediately jump to patched copies of the basic block. This can ensure that any jump to the original basic block is redirected to the patched basic block.

Trampoline-Based Bytecode Rewriting

Instead of fixing up references inside the code of the contract, according to embodiments, the trampoline-based rewriter may copy all new and changed code to the end of the original contract. The old code is then replaced with a trampoline that jumps out of the original code and into the newly appended code. This avoids fixing up references in the original code and as such does not require data-flow analysis. In fact, even accurate control-flow graph recovery is not needed, as the rewriter only requires a partial control-flow graph. The trampoline-based rewriter must only recover the boundaries of the basic blocks that are modified and the fallthrough edges of these basic blocks.

According to embodiments, the trampoline-based rewriter may work on the basic block level. When an instruction is changed, the whole basic block is copied to the end of the contract. The patch is then applied to this new copy of the basic block. The original basic block is replaced with a jump to the copied basic block, which is called the trampoline code. Whenever the original contract code jumps to the target basic block, the trampoline is executed and the contract now jumps out to the end of the contract code, where the patched basic block is located. The patched basic block at the end of the contract code then naturally jumps back into the original untouched contract code, as long as the applied patch does not change the control-flow instruction that terminates the basic block. However, not all basic blocks terminate with an explicit control-flow instruction, like the JUMP instruction. Whenever a basic block ends with a conditional jump instruction (JUMPI) or simply does not end with a control-flow instruction, there is an implicit edge in the control-flow graph. This fallthrough edge is simply the continuation of the execution of the instruction at the next address.

To handle the fallthrough edge, two cases have to be considered. When the basic block targeted by the fallthrough edge starts with a JUMPDEST instruction, then the basic block is marked as a legitimate target for regular jumps. In this case, it may be provided that an explicit jump is appended to the rewritten basic block at the end of the contract and it may be ensured that execution continues at the beginning of the following basic block in the original contract code. In case the following basic block does not begin with a JUMPDEST instruction, the EVM may forbid explicit jumps to this address. To handle this case the rewriter copies the basic block to the end of the contract right behind the rewritten basic block, constructing another fallthrough edge in the control-flow graph of the rewritten code.

Figure 9:
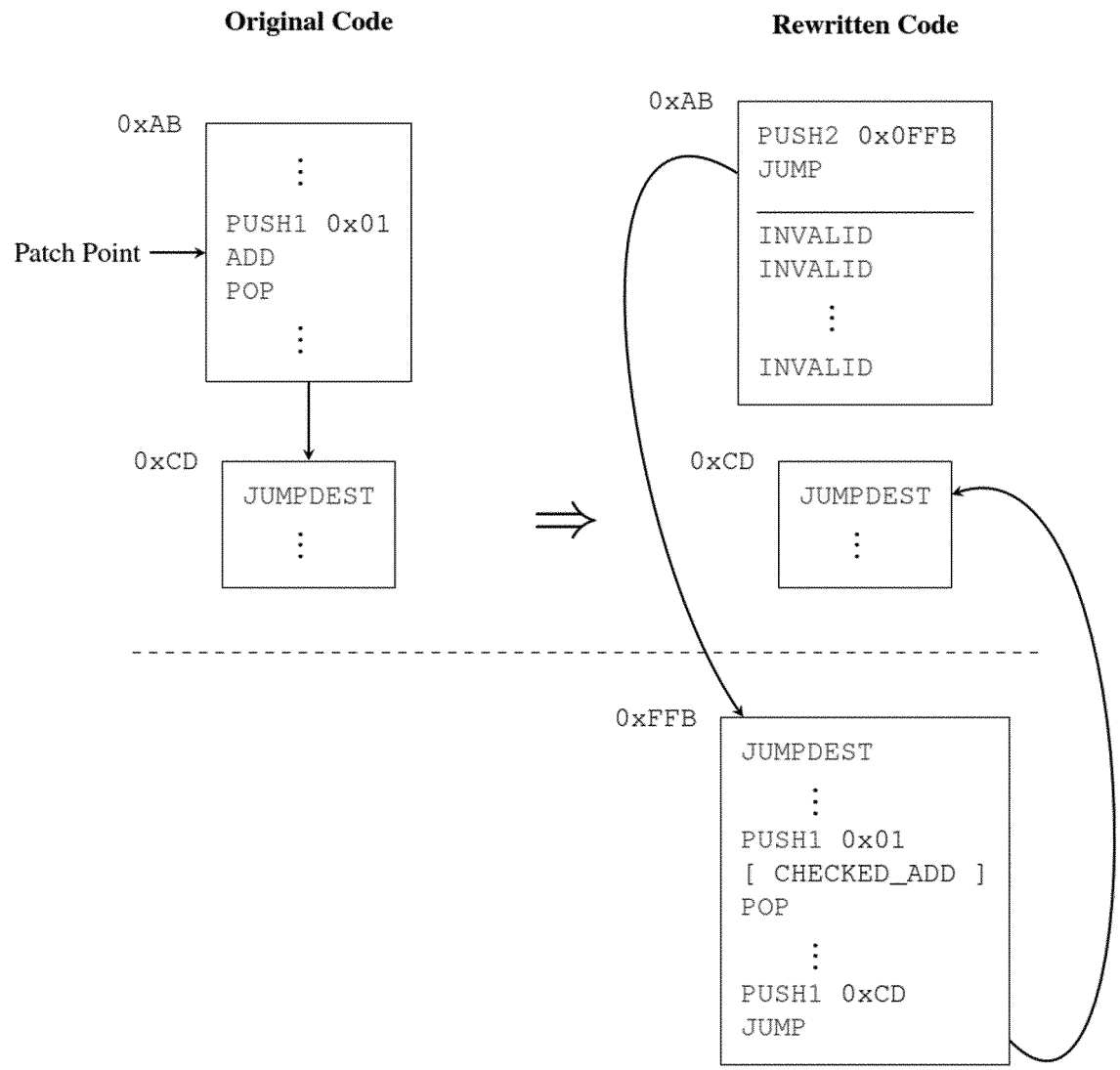
FIG. 9 is a schematic view illustrating an example how a rewriter works according to an embodiment of the invention.

FIG. 9 shows an example how the rewriter works according to an embodiment of the invention. The original code on the left and the rewritten code on the right. The original basic block is replaced with a trampoline that jumps to the patched version of the basic block. The patched basic block is appended right after the end of the original contract.

Referring to FIG. 9, the normal ADD instruction is replaced with a check add routine, that additionally performs integer overflow checks. It may be provided that the address of the ADD instruction is called the patch pointer. To achieve this the basic block, which contains the patch point, is replaced with a trampoline. In this case it immediately jumps to the basic block at 0xFFB. This basic block, which is located at the end of the contract, is a copy of the original basic block at 0xAB, but with the patch applied. Since the basic block is now at the end of the contract, the bytecode rewriter can insert, change and remove instructions in the basic block without potentially changing the addresses of the following basic blocks. The rest of the original basic block is filled with the INVALID instruction. The rewriter appends and explicit jump to the patched basic block at 0xFFB, which ensures execution continues in the original contract's code at address 0xCD.

The EVM enforces some separation of code and data in the code address space. Most EVM implementations prevent jumps into of the data constants that are embedded into the PUSH instructions. The constant operands of the push instructions follow directly the byte of the instruction opcode. Such a constant operand can accidentally include the byte for the JUMPDEST operand. Then the constant would be a legitimate jump target and a new unintended instruction sequence would occur. To avoid this EVM implementations perform a linear sweep over the code section to find push instructions. The constants that are part of those push instructions are then marked as data and therefore as invalid jump targets. However, due to performance reasons, EVM implementations ignore control-flow information when marking data. As such, the push instructions opcode byte could be part of some data constant, such as a string or other binary data. For this reason, smart contract compilers accumulate all data constants at addresses strictly larger than any reachable code. This avoids any conflicts between the generated code and data encoded into the code address space. However, the trampoline-based rewriter does append code behind the data constants of the smart contracts. To avoid that code appended to by the rewriter is accidentally marked as an invalid jump destination due to a preceding push opcode byte, it is inserted padding between the data of the original contract and the newly appended code. To compute the necessary length of the padding it may be perform the same linear sweep as the EVM implementations.

Most contracts contain additional meta-data at the end of the contract. For example, solidity appends a special encoding of a hash value, called the swarm hash, at the end of each contract. It is expected that a contract ends with the swarm hash. As such a bytecode rewriter handles the swarm hash in a special way. Instead of appending code after the swarm hash, the bytecode rewriter inserts new code and data between right before the original swarm hash. This ensures that the swarm hash is always at the end of the contract, even after rewriting. Normal contracts will not reference the swarm hash in their code and as such the address of the swarm hash can be changed without impacting the original code.

The trampoline-based approach to rewriting requires only minimal code analysis and works for most use cases. However, this approach has two disadvantages. First, instructions can only be patched in basic blocks that are big enough (in terms of size in bytes) to also contain the trampoline code, which jumps out to the end of the contract. However, a typical trampoline requires 4 to 5 bytes and typically basic blocks that perform some meaningful computation are big enough to contains the trampoline code. Second, due to the copying of basic blocks the code size increases depending on the basic block that is patched, which increases deployment cost. An evaluation of the overhead induced by inserting the trampolines is presented below, in Section V.B.

According to embodiments, it may be implemented a trampoline-based rewriter in Python. The rewriter can utilizes the pyevmasm library for disassembling and assembling raw EVM opcodes. Furthermore, the rewriter can use the control-flow graph recovery library evm_cfg_builder. This library performs value-set analysis to recover jump targets and build an accurate control-flow graph. However, it may be provided that the rewriter does not rely on this control-flow graph recovery and can build a partial control-flow graph on the fly, if the control-flow graph recovery fails.

Patch Verification

To ensure functional correctness of the patched contracts, embodiments of the invention may re-execute all transactions of the contract and determine if the behavior of the original vulnerable code and the newly patched code differ. First, it may retrieved a list of transactions to the vulnerable contract. Second, it may re-executed the transaction and retrieve the execution trace for each transaction to the vulnerable contract. Then it may re-executed the same transactions, but replace the code of the vulnerable contract with the patched contract code. This can be done using a modified Ethereum client, based on the popular go-ethereum client (e.g., version 1.8.27-stable-3e76a291 may be utilized), since the original Ethereum client does not support this functionality. It may be provided that also the execution trace of the transaction with the patched contract is retrieved. Finally it may be compared both execution traces and ensured that the behavior of both contracts are equal. The Patch Verifier then may produce a list of transactions, where the behavior differs. If there are no such transactions, then it can be assumed that the patch does not inhibit the functionality of the contract.

The execution traces of the vulnerable and patched contracts cannot be exactly equal, since the patching process changes control flow and inserts instructions. Therefore, it may be provided that only potentially state-changing instructions are examined. Further, it may be provided to consider all instructions as state-changing if they either write to storage or transfer execution flow to another contract (e.g., a CALL instruction). Embodiments may then compare the order, parameters and result of all state-changing instructions and report the first instruction where the two execution traces differ. Currently, embodiments may assume that the introduced patches do not introduce any new state-changing instructions. This assumption holds for patches that introduce input-validation code and revert when invalid input is passed. However, the trace difference computation can be adapted to become aware of potential state changes that a patch introduces and ignore those instructions.

The patch verifier then finally outputs a list of transactions with differing behavior. The patched execution trace is then examined in more detail. If the failed transaction is due to a revert in the patched code the transaction is marked as a potential attack. If the failed transaction failed due to out-of-gas, embodiments may re-run the same transaction with an increased gas budget, but issue a warning. Finally, the developer must examine the failed transactions to decide whether the given list of failed transactions are legitimate transactions or actual attacks.

Patch Templates

According to embodiments, the bytecode rewriter may take a patch template, which is specified as short snippet of EVM assembly language. This template is then specialized according to the patched contract and relocated to the end of the patched contract. The augmented assembler of the bytecode rewriter supports symbolic labels in the patch templates, which are resolved when the patched bytecode is generated. This allows for portable implementations of the patch templates.

This template-based approach to patch generation allows to specify multiple generic patches to whole classes of vulnerabilities. The following vulnerability classes could be patched automatically using a template based approach:

Improper Access Control to critical functions can be patched by inserting a check at the beginning of a function to verify that the caller is a certain fixed address or equal to some address stored in the contract's state.

Mishandled Exceptions when using low-level call instructions in solidity the return value is not handled automatically and the contract does not raise an exception. Such issues can be patched by inserting a generic return-value check after call instructions.

Integer Bugs when dealing with integer arithmetic it is easy to introduce problems, since Solidity does not utilize checked arithmetic by default. This has resulted in many potentially vulnerable contracts being deployed and some being actively attacked. It is focused on automatically patching integer bugs as a showcase for a bytecode rewriter according to an embodiment of the invention (see Section V).

However, for certain types of vulnerabilities, which are deeply tied into the business logic of the contract, it might not be possible to write a generic patch template. In this case the developer, would have to develop the patch themselves, which is fully supported by a system according to an embodiment of the invention.

Deployment of Patched Contracts

Embodiments of the invention may provide to utilize a delegatecall-proxy based upgrade pattern to support upgradable smart contracts. This pattern has already been successfully implemented in the ZeppelinOS project. The smart contract is split into two contracts: a proxy contract and a logic contract. The proxy contract is the primary entry point. The address of the proxy contract is fixed and does not change. The proxy contract also directly stores all data. The code of the proxy contract is kept minimal, as this contract's code cannot be upgraded once deployed. The proxy contract simply forwards all calls to the logic contract. The logic contract then contains all the business logic of the contract and handles any incoming transaction. The proxy contract will utilize the DELEGATECALL instruction to call into the logic contract. This gives the logic contract direct and full access to the storage memory area of the proxy contract, allowing the logic contract to access the persistent data without any additional overhead.

To facilitate the upgrade, the proxy contract also implements functionality to store and update the address of the logic contract. To prevent malicious upgrade, the proxy contract also stores the address of an owner, which is allowed to issue upgrades. The upgrade is then simply one transaction to the proxy contract, which will (1) check whether the caller is the owner and (2) update the address of the logic contract. After this transaction the proxy contract forwards all calls to the newly deployed version of the logic contract.

Usecase: Integer Overflow Hardening

One major class of vulnerabilities in smart contracts are integer bugs. Prior work has shown that many contracts are vulnerable and some are actively being attacked. As such, integer bugs and especially integer overflows are a good target for showcasing a bytecode rewriting based patching framework according to an embodiment of the invention.

Integer Overflow Patches

Embodiments of the invention may provide patch templates for detecting integer overflow and underflow for unsigned 256-Bit integer types. These patch templates adds checks inspired by secure coding rules in the C programming language and the checks performed in the SafeMath Solidity library. According to an embodiment, the bytecode rewriter comes with patch templates for checked integer addition, subtraction and multiplication. The patch templates can be used to replace a single arithmetic instruction, which is vulnerable to integer overflows, with a checked variant. As such, the patches are optimized for minimal gas overhead and minimal intrusiveness into the contract. The patches detect when an integer overflow or underflow happened and then issue an exception, which aborts and rolls back the current call to the contract. It is presented an evaluation of the efficiency of the checks in comparison to the popular SafeMath Solidity library in Section V.B.

FIG. 10 shows the original and patched version of the same bytecode, as produced by the bytecode rewriter according to an embodiment of the invention. The top listing shows the original code and the bottom listing shows the rewritten version with a checked addition patch applied. The comments show the gas utilization of the instructions. The original target contract simply adds two constant numbers and then stops execution. It is shown that the original basic block at address 0x00 has been replaced with a trampoline in the patched code. The trampoline immediately jumps to the patched basic block at address 0x07. Here the checked addition patch template has replaced the original ADDinstruction, which was at address 0x04. The inserted trampoline code and the jump-back to the original code amount to 23 additional gas used by the contract. In this example, it is applied a checked add patch template, which verifies the invariant that (a+b) >=a. The checked version of the addition then requires an additional 35 gas, when no overflow is detected.

Evaluation

To verify the correctness of the patches generated by the bytecode rewriter of the embodiment, it is focused on the known vulnerabilities reported by a security company called Peckshield. More specifically, it is found five ERC-20 token contracts (see table of FIG. 11) with confirmed integer overflow/underflow vulnerabilities which have been attacked based on these exploits.

It is applied the automatic patching process with the bytecode rewriter as described in Section V to these contracts. Meanwhile, to compare with manually patched contracts, it is also rewrote these contracts in the Solidity source code by replacing the arithmetic operations where the integer overflow is involved with the functions from the SafeMath library. The patched source code is then compiled with the same solc compiler version and optimization options as the original contract, which can be found on etherscan.io. It is then conducted the patch verification to the resulted contracts generated from both patching methods to verify the correctness of the patches. It is also measured the overhead in gas consumption and the increase in code size, which will lead to higher transaction fees during the contract deployment and operation stage.

Note that in the manual patching method, it is not patched all vulnerabilities detected by Osiris, as it is simulated how a developer would patch the code. As such, it is skipped those checks on the vulnerabilities which cannot be triggered by an attacker. For example, because the potentially vulnerable arithmetic is contained in functions that can only be called by special accounts, such as the controller or owner of the contract, who are considered as benign players.

It is fed the patch verifier component with the real world transactions. More specifically, it is extracted all transactions sent to these contracts till block 7,755,100 (May 13 2019) from the blockchain, counting up to 506,607 transactions in total for the evaluation. Table I shows the transaction execution results during the patch verification phase. It is found that some transactions executed by the revised contracts patched by both the bytecode rewriter according to the embodiment and the SafeMath library have failed. It is checked these transactions and confirm that these are all genuine attacks, except for one transaction (0x776da-02ce8ce3cc882eb7f8104c31414f9fc756405745690bcf8df 21e779e8a4) to HXG that is a false positive. Basically, this transaction tries to burn some tokens at a "blackhole" address balance[0x0]; and the original contract does not mind whether there is an overflow at this address. This is in general a bad coding practice as updating state costs a lot of gas. It should not be stored if not needed. Note that such states are not exploitable, but Osiris is not accurate enough, and the rewriter conservatively applies patches to every arithmetic instruction reported by Osiris.

Apart from the valid attack transactions, which are reverted by the patched contracts, the execution trace of the re-executed transactions matches that of the original transactions. This means that the patched contracts preserve the original behavior as far as the validated transactions are concerned. Recall that the execution trace comparison does not check the exact operation sequence, but rather, it examines the potentially state-changing instructions such as writing to the storage or initiate external calls. It has also been disabled the out-of-gas exception when executing transactions with the patched code, which can consume more gas than what was provided along with the original transactions. In this way, it is avoided failing the re-executed transactions caused by the lack of gas, as it is only focused on verifying whether the patched contracts result in different state updates; and if so, it should only involve potential exploits which cause the transaction to revert.

Gas Overhead: During the transaction re-execution, it is additionally recorded the amount of gas consumption, and the results are presented in the table of FIG. 12. Note that some transactions do not execute those paths, which contain the vulnerable code. Since the patches of the embodiment do not influence those paths, it is excluded those transactions from the results, in which neither the bytecode rewriter, nor the SafeMath have incurred any gas overhead. In the table of FIG. 12, it is shown that for contract BEC, SMT and HXG, those patched on the EVM level incur less gas overhead at runtime (83, 47, and 120) when compared to those patched on the source code level (164, 108, and 541). When patching the integer overflow checks on the source code level utilizing the SafeMath library, the Solidity compiler generates non-optimal code, when only very few checks are added. The reason for this is that Solidity generates internal function calls to call into the SafeMath library functions. This reduces code size when the library function is called from many callsites. However, internal function calls require additional code to setup the internal call and also to return from the internal call. As such, utilizing internal calls decreases overall code size, but increases gas overhead. For integer overflow checks, which are typically rather short, the evaluation shows that the bytecode rewriting approach introduces less gas overhead. A typical compiler optimization is function inlining, which could bring the source-level patched version to similar overhead as the rewritten version.

It is also noticed that contracts UET and SCA patched on the EVM level do not present the same observation. In fact, UET requires 255 units of additional gas on average for every transaction after the upgrade, comparing to 21 gas if using manually patched approach. This is because while the bytecode rewriter patched every reported vulnerability in these two contracts (12 and 10 respectively), not all of these vulnerabilities are handled in the manual patching, as the relevant integer overflow bugs can only be triggered by contract owners or controllers. Sometimes it is also due to the bad coding practice and the accuracy of Osiris analysis. For instance, it is found that some state in the contract can encounter potential overflow/underflow, but the variable is not referred elsewhere inside the contract and therefore the overflow/underflow cannot be exploited. Notice that the gas overhead for SCA is 0 with the manual patching method. Since there are only 292 transactions sent to this contract, the only transaction that triggers the integer boundary check added by the SafeMath patcher is the attack transaction and it results in a revert. Therefore this transaction is not taken into account during the statistic analysis.

Code Size Increase: Deploying contracts to the blockchain also incurs costs, which is in proportion to the size of the deployed contract. More specifically, Ethereum charges 200 gas per byte for a CREATEoperation to store the contract code into state. Therefore, it is also measured the amount of extra bytes added to the contracts by both patching methods and the results can be found in the table of FIG. 12. It is shown that when there is one vulnerability involved, the amount of extra code added by the rewriter is comparable to that by the SafeMath approach. For instance, the size of the BEC contract increases by 117 B and 133 B respectively, while that of the SMT contract increases by 191 B and 97 B respectively. Since approach according to an embodiment duplicates the original basic blocks, the incurred code size overhead depends on the specific location of the vulnerability. It can be smaller than the SafeMath approach (in the case of BEC), because the compiler generates more code for the SafeMath library than what is necessary for the patch; or it can be bigger, if the involved basic block contains many instructions, as in the case of SMT.

However, when more vulnerabilities are involved the byte-code rewriter of the embodiment also incurs a higher overhead. Since the rewriter of the embodiment generates a patch for every vulnerability without reusing the patch code, the size of the upgraded contracts grows along with the number of patches applied. For example, the byte-code rewriter generates 12 patches for UET contract and 10 patches for SCA contract, resulting in 1,299 B (18.2%) and 3,811 B (17.3%) increase in code size. On the contrary, the SafeMath approach only increases the size by 541 B (7.6%) and 361 B (1.6%) respectively. Because SafeMath works on the source code level, it can apply several optimizations. First, SafeMath does not need to duplicate basic blocks for every patch. Second, SafeMath utilizes an internal functions call to jump to the integer overflow checking code, while the rewriter according to an embodiment inserts the checking code directly into every patched basic block. Third, due to the manual patching the SafeMath patched contracts contain less integer overflow checks, since unexploitable integer arithmetic is not patched by the developer. However, the patch templates are optimized for patching a single vulnerable arithmetic. It is straight forward to adopt an approach akin to Solidity's internal function calls when developing patch templates for the bytecode rewriter according to an embodiment. This would allow us cut down the code size overhead, when patching a larger number of integer overflows.

In addition to these five contracts, Osiris provides a set of 14,107 distinct contracts (Osiris has run the analysis over 50,535 unique contracts in the first 5,000,000 blocks of the Ethereum blockchain), where Osiris detects at least one integer overflow vulnerability. It is patched these contracts only with the bytecode rewriter, as not all of those contracts have source code available. From the results shown in table of FIG. 13, it is shown that while the original size of the contracts is 8,142.7 B on average, the size increases by 455.9 B (5.6%) on average after applying the patches. Given that Ethereum charges 200 gas per byte to the contract creation transaction, it incurs an average overhead of 91,180 gas or 0.021 USD (The calculation is based on 235.091 USD/ETH and a gas price of 1 gwei.) during the contract deployment. This shows that the overhead of applying patches with bytecode rewriting is negligible during contract deployment.

Figure 14:
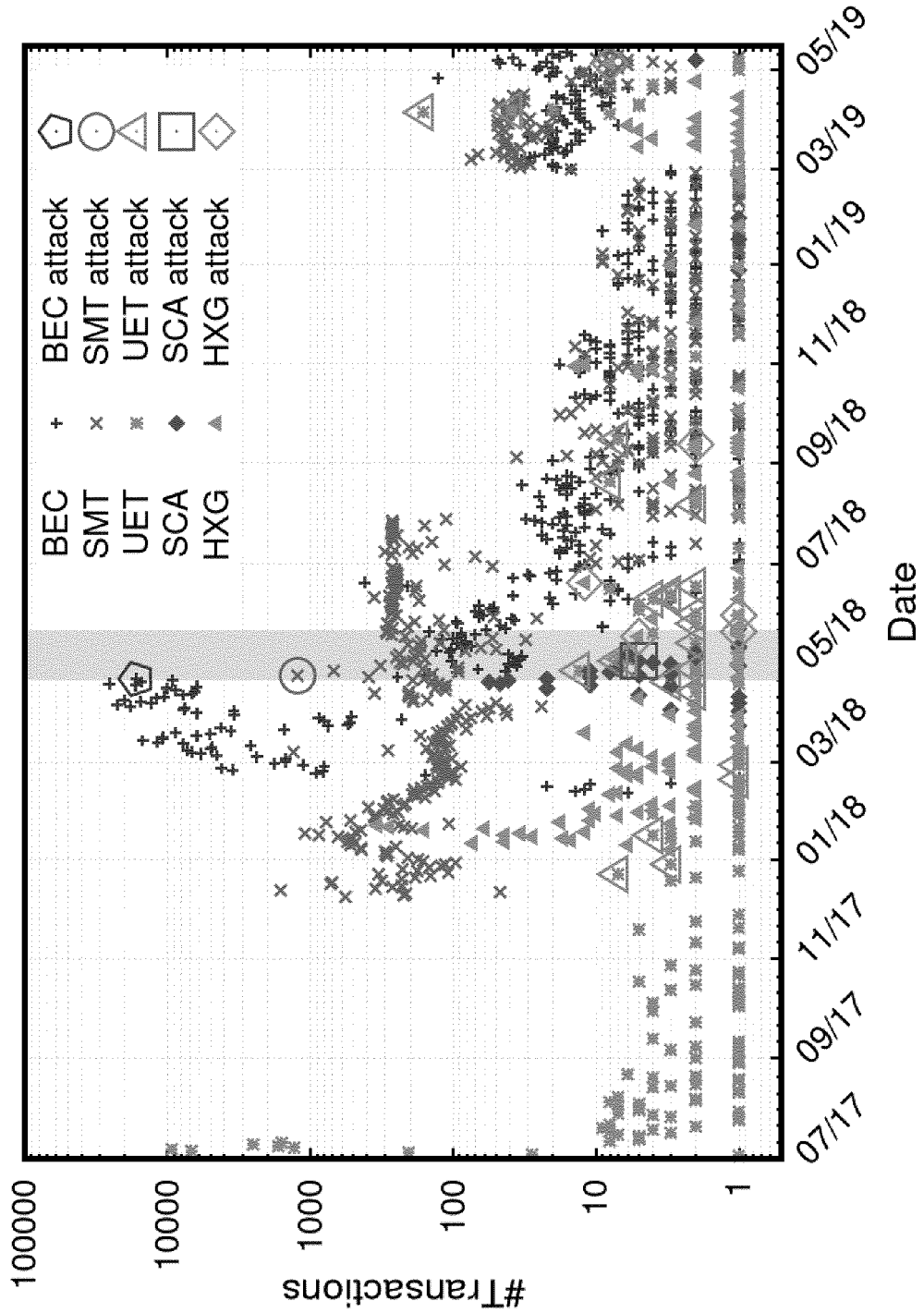
FIG. 14 is a diagram illustrating an activity timeline of each contract, wherein the grey shadow indicates the time window in which the vulnerabilities of these contracts are disclosed by Peckshield, and the big hollow points signify the occurrence of the attacks.

Finally, it is drawn a timeline of the invoked transactions for each contract in FIG. 14, and it is marked the detected attacks, which are reverted by the patched contracts, as well as the time window when the corresponding CVEs are disclosed in the figure. It is shown that while the vulnerabilities of the other token contracts have been reported within a fairly reasonable time after the first attack, UET has been exploited (5 months) long before the bug disclosure. More surprisingly, all contracts are still fairly active though they encountered a decrease of transaction volume after public disclosure of the vulnerabilities. Despite the fact that all of these vulnerabilities have been discovered around one year before the time of writing, there are still 23,630 transactions (4.66% of the evaluated transactions) issued to these vulnerable contracts after the public disclosure of the vulnerabilities, including successful attacks.

Analysis False Positives/Negatives

During analysis of the contracts, it has been identified false positives and negatives when patching all integer overflow bugs reported by OSIRIS. This shows that the patch verification according to an embodiment may be an important step in the process, as many analysis tools are neither sound nor complete. It has been both identified false positives and false negatives in the 5 token contracts that has been analyzed in depth. It has been found that contrary to the statements in the original OSIRIS paper (cf. C. Ferreira Torres, J. Schutte, and Others, "Osiris: Hunting for integer bugs in ethereum smart contracts," in 34th Annual Computer Security Applications Conference (ACSAC18), San Juan, Puerto Rico, USA, Dec. 3-7, 2018, 2018. [Online]. Available: http://orbilu.uni.lu/handle/10993/36757), not all vulnerabilities are accurately detected. It is found that in the default configuration OSIRIS often achieves poor code coverage. It is utilized different timeout settings for both the whole analysis and for all queries to the SMT solver. It is combined the results of multiple runs with different timeout options to achieve better code coverage. Nevertheless it is found two cases, were OSIRIS did not accurately report the integer overflow bugs.

Hexagon (HXG) Token: The Hexagon Token contract is vulnerable to an integer overflow, which allows an attacker to transfer very large amounts of ERC-20 Tokens. Osiris reports two false positives, which are cause by strange EVM code that is generated by the Solidity compiler. FIG. 15 shows the Solidity and corresponding EVM code. Even though all types are unsigned types in the solidity source code, the compiler generates a signed addition. Here Osiris rightly so reports a possible integer overflow, when —2 is added to the balanceOf mapping variable. When performing signed integer additions with negative values, the addition naturally overflows when the result moves from the negative value range into the positive value range and vice versa. When patching the ADD on line 12 in the lower listing of FIG. 15, with a checked addition, it is introduced a false positive. The patch verifier in the pipeline marked almost all transactions failing, when the original contract was not. This is indicator for a failed patch. Through manual analysis of the patched contract's bytecode, it may be determined the reason for the faulty patch and attributed it to a false positive in Osiris. However, Osiris does correctly infer the type of the integer as an unsigned integer and then correctly reports an overflow. The problem here is the assumption, that the compiler would never treat an unsigned integer as a signed integer, which is a reasonable assumption. It is conclude that the root cause is probably a compiler bug in Solidity, as the generated code requires an additional instruction, when compared to a simple unsigned subtraction.

Social Chain (SCA): It is found that Osiris does detect a possible overflow in the Solidity source code line, which is considered problematic. However, Osiris only reports the multiplication as vulnerable to integer overflow. In the actual attack transaction it is the following addition that overflows. As such, the automatically patched contract is still vulnerable, due to the false negative in OSIRIS. It can be noticed this when re-executing all transactions and comparing with the manually patched version of the contract as part of running the patch verification according to an embodiment.

The DAO attack has first attracted the public's attention in 2016 on exploits in smart contracts with its huge economic damage. Since then, the blockchain community starts to conduct auditing and vulnerability analysis of smart contracts, while more and more exploits have been discovered. Among these studies, many tools have been developed based on symbolic executions, formal verification, and taint analysis. These analysis tools can help developers to check potential vulnerabilities of their contracts before deploying them, thus preventing attacks. However, there are still no effective methods to easily patch contracts once they have been deployed. Some dynamic analysis tools such as Sereum can be integrated into EVM to stop live attacks on vulnerable contracts; however, the deployment of such tools requires collaboration with the blockchain development team to upgrade their client software. Such process can be very time-consuming, leaving these analysis tools mostly disconnected from the blockchain network.

A more straightforward, but ad-hoc, approach is that the developers of the vulnerable contracts get informed of the exploits and bugs, and apply the patches to their contracts manually. Then the patched contracts can replace the buggy versions through the delegatecall proxy pattern (c.f. Section II) with frameworks such as ZeppelinOS. The main challenge of this approach is that the contract developers have to check whether the introduced patch changes the business logics and whether the Solidity compiler break things unexpectedly because of different versions for example. Such consistency check can be achieved with the help of unit tests, if there are any, and some tools that perform the "upgradeability" checks such as Slither. In addition to a static analysis framework [40], Slither also reviews the contract source code and checks whether it still aligns with the delegatecall proxy pattern, and if the variables are declared in the same order. Solidity compiler assigns sequential addresses in the storage to contract-scope variables based on their order of declaration. If variables are declared in different orders in the upgraded contract, it can be a problem as the existing data are then mapped to different variables. As it is found, such ad-hoc patching method requires both time and experience of the contract developers.

A contract patching framework (i.e. a contract rewriting framework system) according to an embodiment of the present invention, on the other hand, may combine existing analysis tools and may provide a semi-automatic method to patch the detected vulnerabilities and may verify the contract consistency after the patch. Although the patch verification dataset may not be complete, it is a complementary to existing unit tests. Moreover, bytecode rewriting prevents potential problems caused by unexpected behaviors from compilers.

It is also shown a use case to patch the integer overflow vulnerabilities using an embodiment according to the invention. Osiris extended the symbolic execution tool Oyente to support type inference and integer bug detection on the bytecode level. This improved symbolic executor first tries to infer the integer type, i.e., signedness and bit width, from the specific optimization instructions generated by Solidity compilers. It then checks for possible integer bugs, such as truncation, overflow, underflow, and wrong type casts. Other tools such as TeEther and MAIAN implicitly find integer bugs when they generate exploits for smart contracts. However, as these tools are not geared towards finding integer bugs, they do not pinpoint to the exact location in the code, where the integer overflow happens.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B or C" or "at least one of A, B or C" should be interpreted as including any singular entity from the listed elements, e.g., A, any subset from the listed elements, e.g., A and B, or the entire list of elements A, B and C.

The invention claimed is:

1. A method for supporting smart contracts in a blockchain network, the blockchain network being a distributed blockchain network having nodes, each node, of the nodes, that validates transactions running a virtual machine for executing a smart contract, a contract rewriting framework system being provided, the contract rewriting framework system comprising a vulnerability detection tool, a rewriter tool, and a deployment component, the method comprising:
  obtaining, by the deployment component, a permission to upgrade the smart contract, the permission being granted to the deployment component by a creator or owner of the smart contract during a creation phase of the smart contract;
  retrieving, by the contract rewriting framework system, the smart contract from the blockchain network, the smart contract being passed to the vulnerability detection tool;
  detecting, by the vulnerability detection tool, a vulnerability in the smart contract, the vulnerability detection tool determining a type of the vulnerability and an instruction location of the vulnerability;
  rewriting, by the rewriter tool, the smart contract to include a patch for fixing the vulnerability, a patched smart contract being generated by the rewriter tool based on the type of the vulnerability and the instruction location of the vulnerability; and
  issuing, by the deployment component, an upgrade transaction including the patched smart contract to the blockchain network, such that the patched smart contract is deployed in the blockchain network.

2. The method according to claim 1, wherein the smart contract retrieved by the contract rewriting framework system is a smart contract code in a binary format, in particular in bytecode.

3. The method according to claim 1, wherein the patched smart contract, generated by the rewriter tool, is a new or modified smart contract code in a binary format, in particular in bytecode.

4. The method according to claim 1, wherein the patched smart contract is generated by preparing a patched code in a binary format for replacing a vulnerable block of the original smart contract code.

5. The method according to claim 1, wherein the instruction location of the vulnerability includes a program counter.

6. The method according to claim 1, wherein the smart contract, which is retrieved by the contract rewriting framework system from the blockchain network, is passed to the rewriter tool, wherein the rewriter tool patches the smart contract based on the type of the vulnerability and the instruction location of the vulnerability, such that the patched smart contract is generated.

7. The method according to claim 1, wherein the rewriter tool lifts the smart contract to an intermediate representation while the instruction location of the vulnerability is interpreted, and
  wherein after including a patch code snippet in the intermediate representation, the intermediate representation is compiled back in a binary format such that the patched smart contract is generated.

8. The method according to claim 1, wherein the rewriter tool adds a patch code snippet to an unused address space,
  wherein the rewriter tool replaces a vulnerable code in the smart contract with a trampoline jump such that an instruction pointer jumps to the patch code snippet, and
  wherein, after the patch code snippet finishes execution, the instruction pointer jumps back to original subsequent code of the smart contract to continue executing of the remaining part of the smart contract.

9. The method according to claim 1, wherein the deployment component of the contract rewriting framework system represents a predetermined account, wherein the predetermined account is used for upgrading the smart contract of the blockchain network, wherein the upgrade transaction is accepted by a node of the blockchain network, from which the smart contract is retrieved, based upon determining that the upgrade transaction is signed by the predetermined account.

10. The method according to claim 1, wherein a predetermined address for smart contract deployment is defined, such that a transaction that is sent to the predetermined address is understood as the upgrade transaction for upgrading the smart contract.

11. The method according to claim 1, wherein the upgrade transaction has a payload that comprises the patched smart contract and an address.

12. The method according to claim 11, wherein the nodes of the blockchain network, which receive the upgrade transaction, check the original smart contract at the address based on the upgrade transaction and retrieve the predetermined account represented by the deployment component.

13. The method according to claim 11, wherein the nodes of the blockchain network verify a signature of the upgrade transaction, wherein the blockchain nodes replace the smart contract at the address with the patched smart contract, abased upon determining that the upgrade transaction is valid.

14. The method according to claim 1, wherein the contract rewriting framework system further comprises a patch verifier, wherein the rewriting tool passes the patched smart contract to the patch verifier, wherein the patch verifier extracts transactions that were sent to the original smart contract and re-executes them, wherein collected execution traces resulting from the original smart contract and the patched smart contract are compared to verify that they do not lead to different state update, except for those malicious transactions that are reverted by the patched smart contract, such that the patch verifier can confirm consistency of the logic of the patched smart contract.

15. A contract rewriting framework system for supporting smart contracts in a blockchain network, the blockchain network being a distributed blockchain network having nodes, each node, of the nodes that validates transactions running a virtual machine for executing a smart contract, the contract rewriting framework system comprises:
  a vulnerability detection tool;
  a rewriter tool; and
  a deployment component,
  wherein the deployment component is configured to obtain a permission to upgrade the smart contract, wherein the permission is granted to the deployment component by a creator or owner of the smart contract during a creation phase of the smart contract,
  wherein the contract rewriting framework system is configured to retrieve the smart contract from the blockchain network, wherein the smart contract is passed to the vulnerability detection tool,
  wherein the vulnerability detection tool is configured to detect a vulnerability in the smart contract, the vulnerability detection tool determines a type of the vulnerability and an instruction location of the vulnerability,
  wherein the rewriter tool is configured to rewrite the smart contract to include a patch for fixing the vulnerability, wherein a patched smart contract is generated by the rewriter tool based on the type of the vulnerability and the instruction location of the vulnerability, and
  wherein the deployment component is configured to issue an upgrade transaction including the patched smart contract to the blockchain network, such that the patched smart contract is deployed in the blockchain network.

\* \* \* \* \*